United States Patent
Sugio et al.

(10) Patent No.: US 8,720,173 B2
(45) Date of Patent: May 13, 2014

(54) CLIMB-UP ASSIST STRUCTURE FOR MOWER UNIT

(71) Applicant: Kubota Corporation, Osaka (JP)

(72) Inventors: Akihito Sugio, Sakai (JP); Kazuo Samejima, Kaizuka (JP); Yoshikazu Togoshi, Osaka (JP); Koji Fujiwara, Sakai (JP); Takuhisa Yamamoto, Tondabayashi (JP); Eiji Satou, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/676,526

(22) Filed: Nov. 14, 2012

(65) Prior Publication Data

US 2013/0111868 A1     May 9, 2013

Related U.S. Application Data

(62) Division of application No. 12/705,727, filed on Feb. 15, 2010, now Pat. No. 8,336,281, which is a division of application No. 12/042,871, filed on Mar. 5, 2008, now Pat. No. 7,685,800.

(30) Foreign Application Priority Data

Mar. 30, 2007  (JP) .................................. 2007-093500
May 25, 2007  (JP) .................................. 2007-139341

(51) Int. Cl.
    *A01D 67/00*    (2006.01)
(52) U.S. Cl.
    USPC ............................. 56/320.1; 14/69.5; 254/88

(58) Field of Classification Search
    USPC ................... 56/320.1, 17.2, 17.1, 16.7, 208;
                         14/69.5; D34/32; D12/217; 254/8;
                         414/228, 393, 391, 401, 537, 485
    See application file for complete search history.

(56) References Cited

U.S. PATENT DOCUMENTS

| 1,871,129 | A |   | 8/1932 | Pierce |
| 2,272,234 | A |   | 2/1942 | Laurent |
| 2,272,334 | A | * | 2/1942 | St Laurent ...................... 254/88 |
| 3,147,871 | A | * | 9/1964 | Rogers .......................... 414/469 |
| 3,386,703 | A |   | 6/1968 | Thumma |
| 4,327,896 | A |   | 5/1982 | Whitehead |
| 4,984,657 | A |   | 1/1991 | Burns |
| 5,118,081 | A |   | 6/1992 | Edelman |
| 5,176,361 | A |   | 1/1993 | Ayala, III |
| D347,503  | S |   | 5/1994 | Wallace et al. |
| D351,710  | S | * | 10/1994 | Richardson ................... D34/32 |

(Continued)

FOREIGN PATENT DOCUMENTS

| JP | 5555040 | 10/1953 |
| JP | 5128524 | 8/1976 |

(Continued)

*Primary Examiner* — Árpád Fábián-Kovács
(74) *Attorney, Agent, or Firm* — The Webb Law Firm

(57) ABSTRACT

A mower unit configured to be supported to a work vehicle at a position between front wheels and rear wheels, comprises a mower deck; at least one blade supported by the mower deck; a climb-up assist member in which an inclined surface is formed for assisting the wheels in climbing over the mower unit; and a connecting device for detachably connecting the climb-up assist member to the mower unit in a service position in which the inclined surface assists the wheels in climbing over the mower unit.

5 Claims, 21 Drawing Sheets

(56) References Cited

U.S. PATENT DOCUMENTS

| | | |
|---|---|---|
| RE34,889 E | 4/1995 | Fogarty et al. |
| 5,410,865 A | 5/1995 | Kurohara et al. |
| 5,483,715 A | 1/1996 | Fogarty et al. |
| 5,503,368 A * | 4/1996 | Torres ............................ 254/88 |
| D388,927 S * | 1/1998 | Morgan ........................ D34/32 |
| 5,781,954 A * | 7/1998 | Mayer ............................ 14/69.5 |
| 5,863,026 A * | 1/1999 | Gano et al. ....................... 254/88 |
| 5,894,618 A | 4/1999 | Jacobson et al. |
| 6,135,420 A | 10/2000 | Johnston et al. |
| 6,276,119 B1 | 8/2001 | Oshima et al. |
| 6,557,330 B2 | 5/2003 | Hubscher |
| 6,718,588 B1 | 4/2004 | Frederiksen |
| 6,993,801 B2 | 2/2006 | Marko |
| 7,003,836 B2 | 2/2006 | Berg |
| 7,040,461 B2 * | 5/2006 | Chrisco et al. .................. 188/32 |
| 7,073,777 B2 | 7/2006 | Branstetter |
| 7,104,524 B1 | 9/2006 | Hidding et al. |
| 7,111,444 B1 | 9/2006 | Morris et al. |
| D531,568 S | 11/2006 | Davidian |
| 7,222,838 B1 | 5/2007 | Ji |
| D608,520 S * | 1/2010 | Fick et al. ....................... D34/32 |
| 8,251,350 B2 * | 8/2012 | Fick et al. ....................... 254/88 |
| 2004/0251661 A1 | 12/2004 | Davis |
| 2007/0028577 A1 | 2/2007 | Clement et al. |
| 2007/0261181 A1 | 11/2007 | Willard et al. |
| 2009/0108562 A1 | 4/2009 | Hagenbuch |

FOREIGN PATENT DOCUMENTS

| | | |
|---|---|---|
| JP | 55063606 | 8/1980 |
| JP | 615062 | 2/1986 |
| JP | 6187018 | 6/1986 |
| JP | 62201513 A | 9/1987 |
| JP | 2177803 | 7/1990 |
| JP | 7095892 | 10/1995 |
| JP | 2003-246429 A | 2/2003 |
| JP | 2003169520 A | 6/2003 |
| JP | 2007056493 A | 8/2007 |

* cited by examiner (a)

(b)

(a)

(b)

CLIMB-UP ASSIST STRUCTURE FOR MOWER UNIT

BACKGROUND OF THE INVENTION

1. Field of the Invention

The present invention relates to a mower unit configured to be attached in a position between the front wheels and the rear wheels of a work vehicle, and more specifically relates to a climb-up assist structure that is provided to such a mower unit.

2. Description of the Related Art

A mower climb-up assist structure for a work vehicle is known in which an elongated running board extending to the front and rear of the mower deck, and in which an inclined part is integrally formed at both the front and rear end parts for raising and lowering of the wheels in relation to the mower unit, is integrally fitted to the mower unit so as to straddle the mower deck in the front and rear direction (e.g., JP 51-28524).

In the configuration described above, since the running board is integrally fitted to the mower unit, a vehicle wheel can easily be caused to climb over the mower unit by moving any of the front and rear wheels of the work vehicle to the running board. As a result, there is no need to spend effort to bring the mower unit in between the front wheels and the rear wheels from beside the work vehicle, and the mower unit can be easily positioned between the front wheels and the rear wheels of the work vehicle. There is also no need to spend effort to take the mower unit out from between the front wheels and the rear wheels of the work vehicle, and the mower unit can be easily removed in one of the front and rear directions of the work vehicle from between the front wheels and the rear wheels of the work vehicle.

However, in the configuration described above, the elongated running board that straddles the mower deck in the front and rear direction is integrally fitted to the mower unit, and the overall structure of the mower unit therefore increases in size, and the weight or cost of the mower unit as a whole also increases.

When a common mower unit not provided with a running board is modified to a climb-over specification provided with a running board, an elongated running board must be welded to the mower deck, bolt holes for bolting the running board to the mower deck must be formed, or other processing must be performed, and because painting must be redone after this processing, a large amount of labor is required for the modification. Conversely, when the specifications of the common mower unit must be modified from the climb-over specifications, the mower deck must then be replaced, the connecting holes formed in the mower deck must be filled in and repainted, and other work must be performed, and a large amount of labor is therefore required for the specification change. The cost increases particularly when the mower deck is replaced.

SUMMARY OF THE INVENTION

An object of the present invention is to overcome at least one of the drawbacks of the prior art described above.

A mower unit configured to be supported to a work vehicle at a position between front wheels and rear wheels comprises the following:
 a mower deck;
 at least one blade supported by the mower deck;
 a climb-up assist member in which an inclined surface is formed for assisting the wheels in climbing over the mower unit; and
 connecting means for detachably connecting the climb-up assist member to the mower unit in a service position in which the inclined surface assists the wheels in climbing over the mower unit.

In an embodiment, the mower deck preferably has a rear wall, and the service position of the climb-up assist member is preferably a position in which the climb-up assist member is disposed behind a rear wall of the mower deck.

In an embodiment, the connecting means preferably comprises a tumup portion that is formed at a lower edge of the mower deck and folded upwardly and outwardly of the mower deck, and an engaging portion provided to the climb-up assist member, for releaseably engaging the tumup portion.

In an embodiment, the mower unit preferably comprises connecting means for detachably connecting the climb-up assist member to the mower unit in a storage position.

In an embodiment, the mower unit preferably comprises an anti-slip portion disposed in a vicinity of a rear end portion of the climb-up assist member, for preventing wheels of the work vehicle from slipping when the work vehicle climbs over the mower deck.

In an embodiment, a forward portion of the climb-up assist member forwardly of the anti-slip portion is preferably &Lined so as to tilt downward and to the rear.

In an embodiment, the mower unit preferably comprises a transmission mechanism for driving the blade; and a transmission cover for covering the transmission mechanism from above; wherein the mower deck is a side-discharge-type mower deck in which an internal passage for functioning as a passage for cut grass transport is formed in a front upper portion of the mower deck, and the front upper portion is formed to bulge upwardly along a left-right width of the mower deck; and a top surface of the front upper portion, and a top surface of the transmission cover are at substantially the same height.

DESCRIPTION OF THE PREFERRED EMBODIMENTS

An embodiment in which the present invention is applied to a tractor 1 as an example of a work vehicle will be described hereinafter based on the drawings. A number of embodiments will be described, but combinations of the characteristics of one embodiment with the characteristics of another embodiment are also included in the scope of the present invention.

Figure 1:
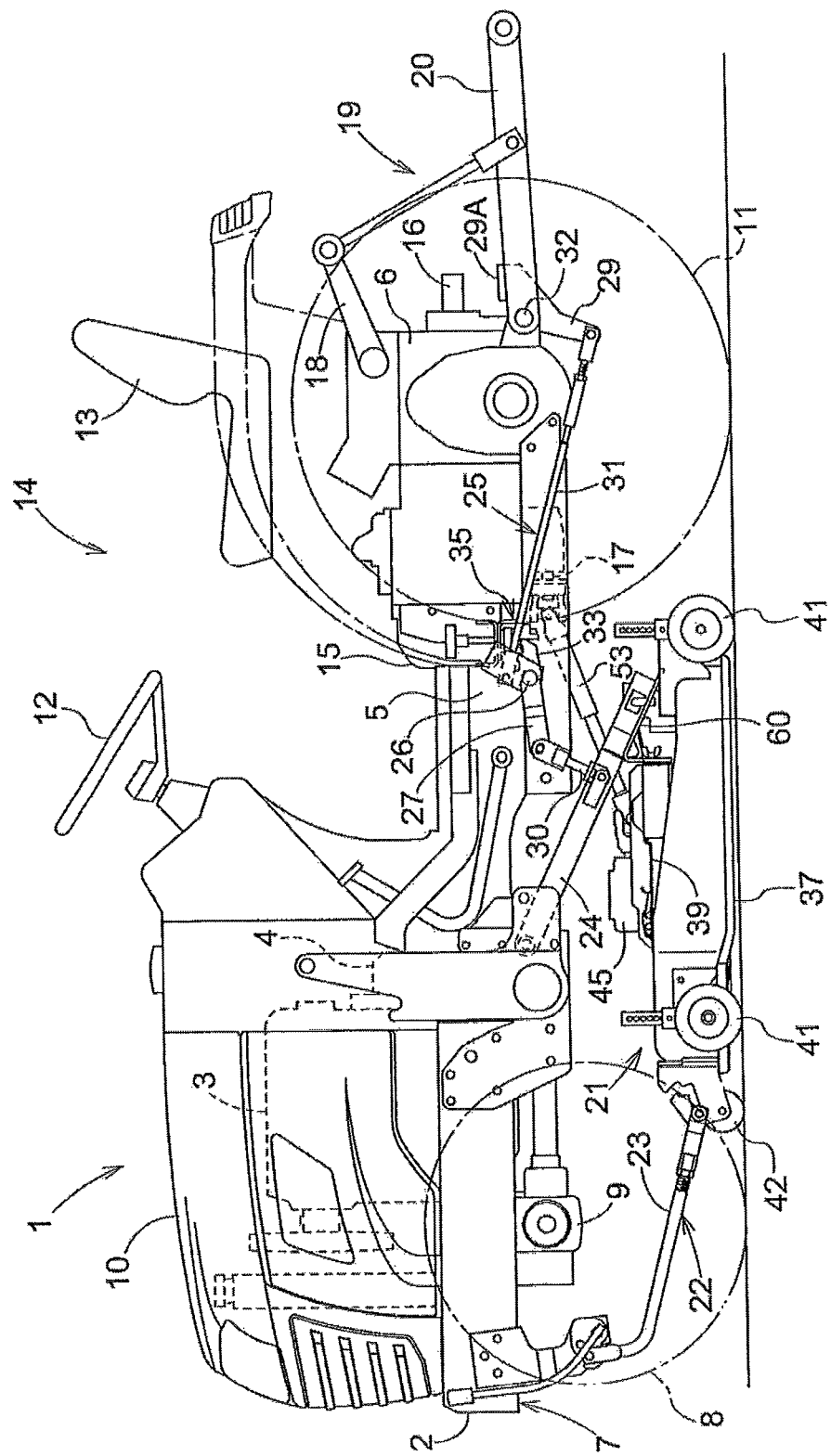
FIG. 1 is an overall side view of the tractor that shows a state in which the mower unit is installed in a tractor.

FIG. 1 is an overall side view of the tractor 1. In the tractor 1 as shown in FIG. 1, a vehicle body frame 7 is formed in which a front frame 2, an engine 3, a clutch housing 4, a middle frame 5, and a transmission case 6 are connected so as to be positioned in sequence from the front side of the vehicle body. A front axle case 9 provided with a pair of left and right front wheels 8 is supported at the front-half portion of the vehicle body frame 7 so as to be capable of rolling, and an engine bonnet 10 or the like for covering the engine 3 and other components from above is also provided. A pair of left and right rear wheels 11 or the like is provided at the rear-half portion of the vehicle body frame 7, and an operating unit 14 provided with a steering wheel 12, an operating chair 13, and other components is formed at the rear-half portion.

Drive force from the engine 3 is transmitted to the input shaft (not shown) of a hydraulic static transmission device (hereinafter abbreviated as HST) 15 connected to the front part of the transmission case 6, via a main clutch (not shown) or the like provided inside the clutch housing 4. The drive force after conversion by the HST 15 is taken off from the output shaft (not shown) of the HST 15 as drive force for travel, and is transmitted to a gear-type transmission device (not shown) provided inside the transmission case 6. The drive force after conversion by the gear-type transmission device is branched inside the transmission case 6 into drive force for the front wheels and drive force for the rear wheels, and the drive force for the front wheels is transmitted to the left and right front wheels 8 via a front-wheel transmission system (not shown) provided inside the transmission case 6, the front axle case 9, or the like. The drive force for the rear wheels is transmitted to the left and right rear wheels 11 via a rear-wheel transmission system (not shown) provided inside the transmission case 6. The unconverted drive force from the input shaft of the HST 15 is transmitted as drive force for work via a work transmission system (not shown) provided inside the transmission case 6 to a first drive force takeoff shaft 16 provided to the rear end part of the transmission case 6, and a second drive force takeoff shaft 17 provided to the bottom part of the transmission case 6.

The rear part of the transmission case 6 is provided with a pair of left and right lift arms 18 that are pivotally driven in the vertical direction by the operation of a hydraulic cylinder (not shown) provided inside the rear part of the transmission case 6, a first link mechanism 19 for pivoting up and down in the vertical direction in conjunction with the pivotal driving the lift arms 18, and other components. The first link mechanism 19 is provided with a pair of right and left lower links 20 or the like formed so as to allow attachment and detachment of a rotary cultivator or other implement (not shown).

In other words, the implement mounted to the first link mechanism 19 can be raised and lowered through the operation of the hydraulic cylinder. The first drive force takeoff shaft 16 is connected to the input shaft of the implement via a transmission shaft (not shown) or the like, whereby the drive force for work that is transmitted to the first drive force takeoff shaft 16 can be fed to the implement.

Although not shown in the drawing, the hydraulic cylinder is configured so that the operation state of a control valve for controlling the flow of operating fluid to the hydraulic cylinder is switched in conjunction with the pivoting operation of a raising and lowering lever provided to the operating unit 14, whereby the operating state is switched to an operating state that is in accordance with the operating position of the raising and lowering lever.

Figure 2:
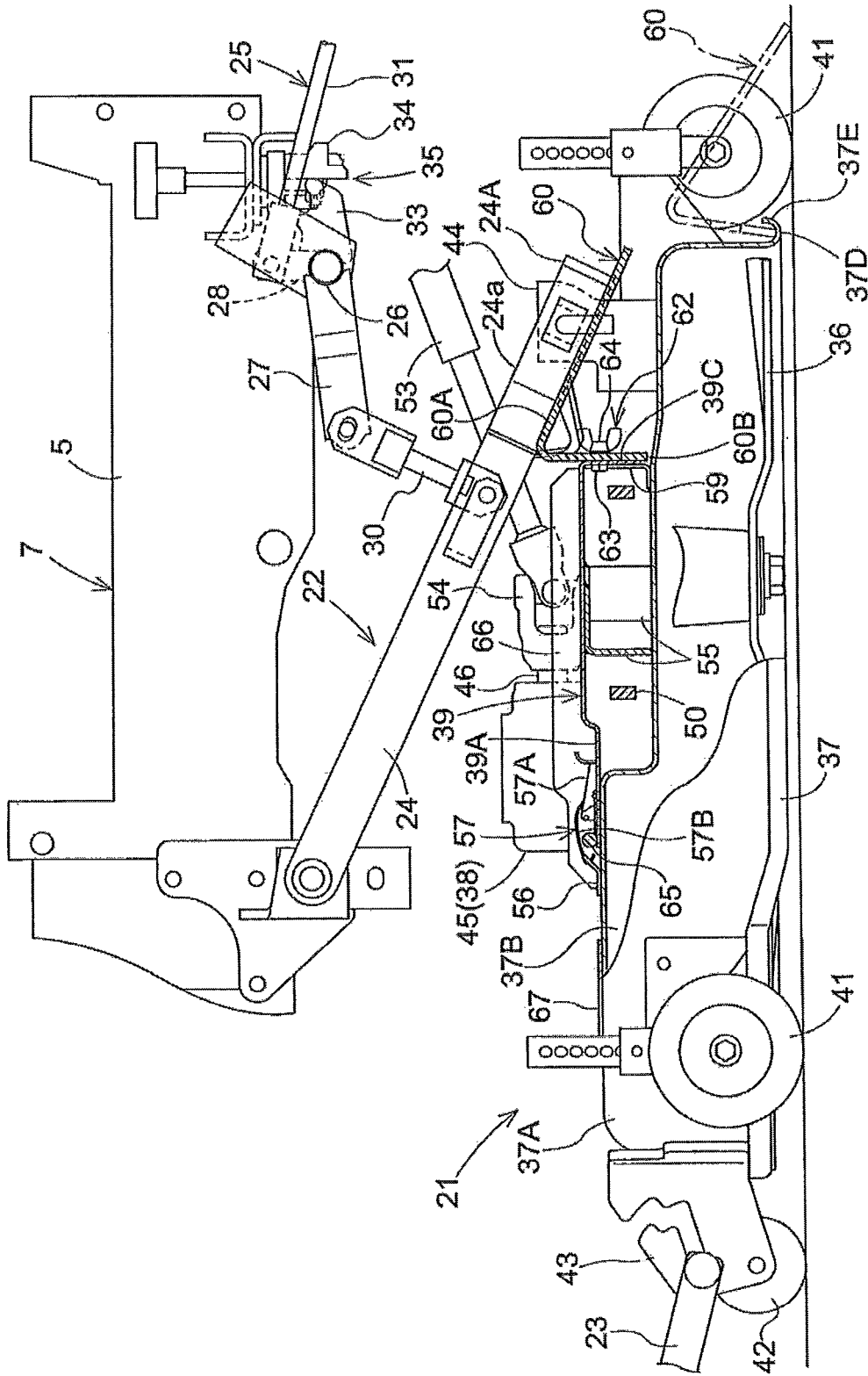
FIG. 2 is a partial side view of the relevant parts that shows the positional relationship between the mower unit and the climb-up assist member.

As shown in FIGS. 1 and 2, a second link mechanism 22 for suspending and supporting a mower unit 21 or other implement disposed between (in the lower middle portion of the tractor 1) the left and right front wheels 8 and the left and right rear wheels 11 in the tractor 1 so as to be capable of being raised and lowered is detachably installed in the vehicle body frame 7. The second link mechanism 22 is provided with a pair of left and right first links 23 that extend from the front part of the vehicle body frame 7 to the front end part of the mower unit 21, a pair of left and right second links 24 that extend from the middle portion of the vehicle body frame 7 to the rear part of the mower unit 21, and other components. The second links 24 are linked to the left and right lower links 20 via a linking mechanism 25.

The linking mechanism 25 is composed of a rotation shaft 26 oriented to the left and right that is supported by the vehicle body frame 7 so as to be able to rotate in relative fashion; a pair of left and right first linking arms 27 that extend towards the front of the vehicle body from the rotation shaft 26; a pair of left and right second linking arms 28 that extend upward from the rotation shaft 26; a pair of left and right coupling arms 29 provided to the rear part of the transmission case 6; a pair of left and right first linking rods 30 for linking the left and right first linking arms 27 to the free ends of the corresponding second links 24; a pair of left and right second linking rods 31 for linking the left and right second linking arms 28 to the corresponding coupling arms 29; and other components. The left and right coupling arms 29 are supported by a support axle 32 of the corresponding lower links 20 so as to be able to pivot in relative fashion. Contacting tabs 29A for partially contacting the upper edges of the corresponding lower links 20 are formed in curved fashion on the top parts of the left and right coupling arms 29.

In other words, when the mower unit 21 or other implement is installed in the lower middle portion of the tractor 1, a configuration is adopted in which the mower unit 21 or other implement can be raised and lowered by the operation of the hydraulic cylinder.

A single third linking arm 33 that extends toward the rear of the vehicle body is integrally mounted to the rotation shaft 26. A receiving stopper 34 for preventing the downward pivoting of the left and right second links 24 by stopping the upward pivoting third linking arm 33 is provided in the vehicle body frame 7. The receiving stopper 34 is supported by the vehicle body frame 7 so that rotation is possible about a vertical axis. A plurality of levels of stopping parts (not indicated by reference symbols) set so that the receiving height of the third linking arm 33 varies in the peripheral direction is formed in the cylindrical lower edge part of the receiving stopper 34. When the receiving stopper 34 is rotated about the vertical axis from this configuration, the stopping part for stopping the third linking arm 33 is changed, and the height position of stopping of the third linking arm 33 by the receiving stopper 34 is changed, i.e., the height position at which the receiving stopper 34 prevents the downward pivoting of the left and right second links 24 is changed.

In other words, the third linking arm 33 and the receiving stopper 34 constitute a cutting height adjustment mechanism 35 for adjusting the cutting height of the mower unit 21 by changing the position of the lower limit height of the mower unit 21.

In the linking mechanism 25, the left and right lower links 20 and the left and right coupling arms 29 are configured to have a contact on one side, whereby downward pivoting of the left and right lower links 20 by the operation of the hydraulic cylinder is allowed when downward pivoting of the left and right second links 24 is prevented by the receiving stopper 34.

Figure 3:
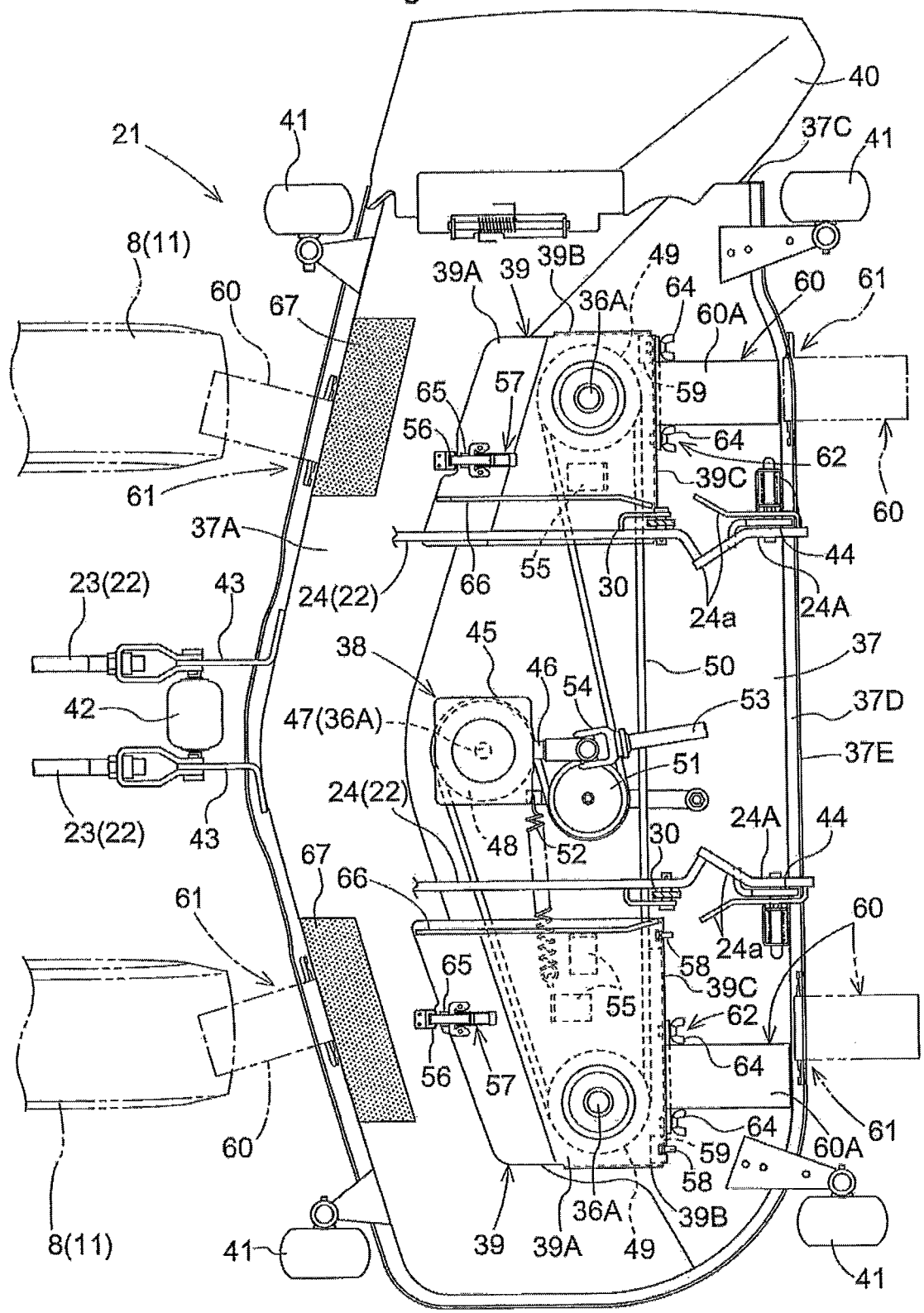
FIG. 3 is a plan view of the relevant parts that shows the positional relationship between the mower unit and the climb-up assist member.

In the mower unit 21 as shown in FIGS. 1 through 3, a transmission mechanism 38 for blade driving is provided to the top part of a mower deck 37 having three blades 36 that are rotationally driven clockwise as viewed in a plane about a corresponding vertical rotation shaft 36A, and a pair of left and right transmission covers 39 for covering the left and right end parts of the transmission mechanism 38 from above are detachably attached to the top part of the mower deck 37. In the mower deck 37, the front upper part 37A thereof is formed so as to expand upward along the left-right width of the mower deck 37 so that the mower deck 37 has an internal passage 37B for transporting cut grass in the front upper part 37A. A discharge vent 37C is formed in the right end of the mower deck 37, and a discharge cover 40 is also attached.

In other words, the mower unit 21 has a side-discharge-type configuration in which the grass cut by the three blades 36 is discharged from the discharge vent 37C at the right end via the internal passage 37B of the front upper part 37A in the mower deck 37 by the conveying airflow generated by the rotation of the blades 36.

In the mower deck 37, four rolling wheels 41 are distributed for the front, rear, left, and right. A roller 42 is provided at the center of the front part of the mower deck 37. The free end parts of the corresponding first links 23 of the second link mechanism 22 are detachably linked to a pair of left and right first brackets 43 for supporting the roller 42. A pair of left and right second brackets 44 to which the free end parts 24A of the corresponding second links 24 of the second link mechanism 22 is detachably linked by a pin are provided to the rear part of the mower deck 37.

In the transmission mechanism 38, an input shaft 46 by which the drive force from the second drive force takeoff shaft 17 of the tractor 1 is transmitted is provided to the rear part of a transmission case 45 disposed in the center of the mower deck 37. The drive force transmitted to the input shaft 46 is transmitted to an output shaft 47 provided to the lower part of the transmission case 45 via a transmission mechanism (not shown) provided inside the transmission case 45. The rotation shaft 36A provided in the center of the mower deck 37, as well as a drive pulley 48, are connected to the output shaft 47 so as to integrally rotate. The rotational force of the drive pulley 48 is transmitted via a transmission belt 50 to driven pulleys 49 that rotate integrally with the rotation shafts 36A that are provided at the left and right of the mower deck 37.

In other words, the transmission mechanism 38 is configured according to a belt transmission system in which the drive force from the second drive force takeoff shaft 17 of the tractor 1 is transmitted by a belt to the rotation shafts 36A of the three blades 36, and the three blades 36 are rotationally driven.

The reference numeral 51 in FIG. 3 indicates a tension pulley that is tensed by a tension spring 52. The input shaft 46 is connected to the second drive force takeoff shaft 17 of the tractor 1 via an extensible transmission shaft 53 and a universal joint 54.

As shown in FIGS. 1 through 5, the left and right transmission covers 39 are formed by folded steel plates so as to have a ceiling wall 39A, an outside wall 39B, and a rear wall 39C. In the ceiling walls 39A, an inverted L-shaped foot portion 55 is welded that comes in contact with the upper surface of the mower deck 37 when the transmission covers 39 are attached to the mower deck 37. In the front part of the ceiling wall 39A, an engaging fixture 57 is provided for detachably engaging to a corresponding ring-shaped engaged fixture 56 provided to the front upper part 37A of the mower deck 37. The engaging fixture 57 is composed of, among other components, an operating part 57A capable of pivoting forward and backward, and a hook-shaped engaging part 57B composed of a leaf spring that changes position between a disengaged position and a engage position with respect to the engaged fixture 56 on either side of a dead point, in conjunction with the pivoting of the operating part 57A. In the rear walls 39C, a pair of left and right elongated holes 39D engaged with corresponding engaging pins 58 that are provided facing rearward in the mower deck 37 is formed so as to extend in the vertical direction. The engaging pins 58 are secured to a total of four receiving plates 59 provided one pair each to the rear side on the left and right of the mower deck 37.

In other words, a connecting mechanism that enables attachment and detachment of the transmission covers 39 with respect to the mower deck 37 is formed by the aforementioned engaged fixture 56, the engaging fixture 57, the left and right elongated holes 39D, the left and right engaging pins 58, and the left and right receiving plates 59. In a state in which the transmission covers 39 are attached to the mower deck 37, the front surfaces of the rear walls 39C of the transmission covers 39 join with the back surfaces of the corresponding receiving plates 59, the lower edges of the elongated holes 39D in the transmission covers 39 join with the corresponding engaging pins 58, and the front ends of the ceiling walls 39A are set so as to join with the front upper part 37A of the mower deck 37. Through this configuration, the left and right transmission covers 39 can be stably attached to the mower deck 37, and when the left and right transmission covers 39 are attached to the mower deck 37, the upper end surface of the front upper part 37A in the mower deck 37 is positioned at substantially the same height as the upper end surfaces of the ceiling walls 39A in the left and right transmission covers 39.

As shown in FIGS. 1 through 6, a pair of left and right climb-up assist members 60 are installed in the tractor 1 and provided with inclined surfaces 60A for assisting the climbing up of the front and rear wheels 8, 11 with respect to the mower unit 21. The climb-up assist members 60 are made of steel plates folded into an L shape as viewed from the side so as to have long, gently sloping inclined surfaces 60A. The inclined surfaces 60A are formed on the elongated side, and the short side is detachably connected to the mower unit 21 via a first connecting means 61 or a second connecting means 62.

The first connecting means 61 detachably connects the climb-up assist members 60 to the mower unit 21 in a service position in which the inclined surfaces 60A assist the climbing up of the wheels 8, 11 with respect to the mower unit 21, and is composed of a folded part 37E formed at the lower edge 37D of the mower deck 37, and an end edge part (engaging part) 60B on the short side of the climb-up assist members 60, wherein the end edge part 60B is configured to detachably engage the folded part 37E from above. The folded part 37E is integrally formed along the entire lower edge 37D by the folding of the lower edge 37D of the mower deck 37 upward and to the outside of the mower deck 37 through press working when the mower deck 37 is formed.

The second connecting means 62 detachably connects the climb-up assist members 60 to the mower unit 21 in the storage position, and is composed of a pair of left and right connecting bolts 63 welded so as to extend towards the rear in the rear walls 39C of the transmission covers 39; butterfly nuts 64 threaded onto the connecting bolts 63; and a pair of left and right concave parts 60C formed in the short sides of the climb-up assist members 60 so as to open downward.

The service position is the position in which the climb-up assist members 60 are disposed with respect to the mower unit 21 so that the inclined surfaces 60A of the climb-up assist members 60 are placed in a state of extending across the ground surface in front from a position the vicinity of the front end upper part of the mower deck 37, or in a state in which the left and right wheels 8, 11 that climb up the inclined surfaces 60A face the corresponding transmission covers 39 in a state in which the inclined surfaces 60A extend across the ground surface behind from a position in the vicinity of the rear end upper part of the mower deck 37.

The storage position is the position in which the climb-up assist members 60 are disposed on the mower unit 21 so that the climb-up assist members 60 are positioned between the rear ends of the corresponding transmission covers 39 and the rear end of the mower deck 37 in the upper part of the mower deck 37.

When the mower unit 21 is moved from the abovementioned configuration to the position between the left and right front wheels 8 and the left and right rear wheels 11 in the tractor 1, the connection in the storage position by the second connecting means 62 is released to detach the climb-up assist members 60 from the storage position, and the climb-up assist members 60 are connected to the mower unit 21 via the first connecting means 61 so as to be positioned in the service position on the rear side, after which the front wheels 8 climb up the inclined surfaces 60A of the corresponding climb-up assist members 60, and climb onto the rear upper part of the mower deck 37 when the tractor 1 is moved forward so that the front wheels 8 of the tractor 1 face towards the corresponding climb-up assist members 60.

When the tractor 1 is moved further forward after the upward climb, the front wheels 8 climb onto the corresponding transmission covers 39 from the rear upper part of the mower deck 37, and move to the front upper part 37A of the mower deck 37 from the corresponding transmission covers 39, after which the front wheels 8 descend towards the ground surface from the front upper part 37A of the mower deck 37.

The left and right front wheels 8 thereby climb over the mower unit 21, and the mower unit 21 is positioned between the left and right front wheels 8 and the left and right rear wheels 11.

Conversely, when the mower unit 21 is removed from between the left and right front wheels 8 and the left and right rear wheels 11 in the tractor 1, the connection of the climb-up assist members 60 in the storage position by the second connecting means 62 is released to detach the climb-up assist members 60 from the storage position, and the climb-up assist members 60 are connected to the mower unit 21 via the first connecting means 61 so as to be positioned in the service position on the rear side, after which the rear wheels 11 climb up the inclined surfaces 60A of the corresponding climb-up assist members 60, and climb onto the rear upper part of the mower deck 37 when the tractor 1 is moved forward so that the rear wheels 11 of the tractor 1 face towards the corresponding climb-up assist members 60.

When the tractor 1 is moved further forward after the upward climb, the rear wheels 11 climb onto the corresponding transmission covers 39 from the rear upper part of the mower deck 37, and move to the front upper part 37A of the mower deck 37 from the corresponding transmission covers 39, after which the rear wheels 11 descend towards the ground surface from the front upper part 37A of the mower deck 37.

The left and right rear wheels 11 thereby climb over the mower unit 21, and the mower unit 21 is positioned behind the tractor 1.

In other words, the mower unit 21 can easily be taken in and out from between the left and right front wheels 8 and the left and right rear wheels 11 without the need for the labor of carrying the mower unit 21 into position between the left and right front wheels 8 and the left and right rear wheels 11 from beside the tractor 1, or carrying the mower unit 21 out from between the left and right front wheels 8 and the left and right rear wheels 11.

When the mower unit 21 is positioned between the left and right front wheels 8 and the left and right rear wheels 11, the left and right climb-up assist members 60 are placed in the service position to the rear, and the left and right front wheels 8 are caused to ascend the inclined surfaces 60A of the corresponding climb-up assist members 60 and to climb over the mower unit 21 as a result of forward travel in which the positional relationship between the left and right climb-up assist members 60 and the left and right front wheels 8 is easily recognized. The mower unit 21 is therefore easily climbed over.

Furthermore, in a state in which the climb-up assist members 60 are positioned in the service position at the rear, the elongated gently sloping inclined surfaces 60A of the climb-up assist members 60 extend across the ground surface behind from a position in the vicinity of the upper rear end part of the mower deck 37, and climbing up over the mower unit 21 can therefore be smoothly performed in a stable riding state in which no instability is felt.

After the mower unit 21 is climbed over, the climb-up assist members 60 are removed from the service position and positioned in the storage position, making it possible to prevent situations in which the climb-up assist members 60 make contact with the ground and resist travel or steering, or damage the area being mowed and cause other problems, during work travel in which the mower unit 21 is connected to the tractor 1.

During climbing of the mower unit 21, the climb-up assist members 60 are connected to the mower unit 21 via the first connecting means 61. Therefore, even when the mower unit 21 is pushed out in the direction away from the climb-up assist members 60 by the front wheels 8 or the rear wheels 11 during movement of the left and right front wheels 8 or the left and right rear wheels 11 from the inclined surfaces 60A of the corresponding climb-up assist members 60 to the rear upper part of the mower deck 37, the mower unit 21 is prevented from moving, along with the climb-up assist members 60 that are prevented from moving by the pressure of the front wheels 8 or the rear wheels 11. Adverse effects on the smoothness of climbing over the mower unit 21 due to separation of the mower unit 21 from the climb-up assist members 60 can thereby be prevented.

As indicated by the dashed line in FIG. 3, when the climb-up assist members 60 are connected to the mower unit 21 via the first connecting means 61 so as to be positioned in the service position on the front side, the rear wheels 11 or the front wheels 8 climb up the inclined surfaces 60A of the corresponding climb-up assist members 60 and climb onto the front upper part 37A of the mower deck 37 when the tractor 1 is moved in reverse so that the rear wheels 11 or the front wheels 8 of the tractor 1 face the corresponding climb-up assist members 60.

When the tractor 1 is also moved in reverse after climbing up, the rear wheels 11 and the front wheels 8 move onto the corresponding transmission covers 39 from the front upper part 37A of the mower deck 37 and descend from the corresponding transmission covers 39 to the rear upper part of the mower deck 37, and then descend towards the ground surface from the rear upper part of the mower deck 37.

The left and right rear wheels 11 or the left and right front wheels 8 thereby climb over the mower unit 21, and the mower unit 21 is positioned between the left and right front wheels 8 and the left and right rear wheels 11, or in front of the tractor 1.

In other words, even when the climb-up assist members 60 are positioned in the service position on the front side, there is no need for the labor of placing the mower unit 21 in between the left and right front wheels 8 and the left and right rear wheels 11 from beside the tractor 1, or carrying the mower unit 21 out from between the left and right front wheels 8 and the left and right rear wheels 11, and the mower unit 21 can be easily moved in and out between the left and right front wheels 8 and the left and right rear wheels 11.

Figure 4:
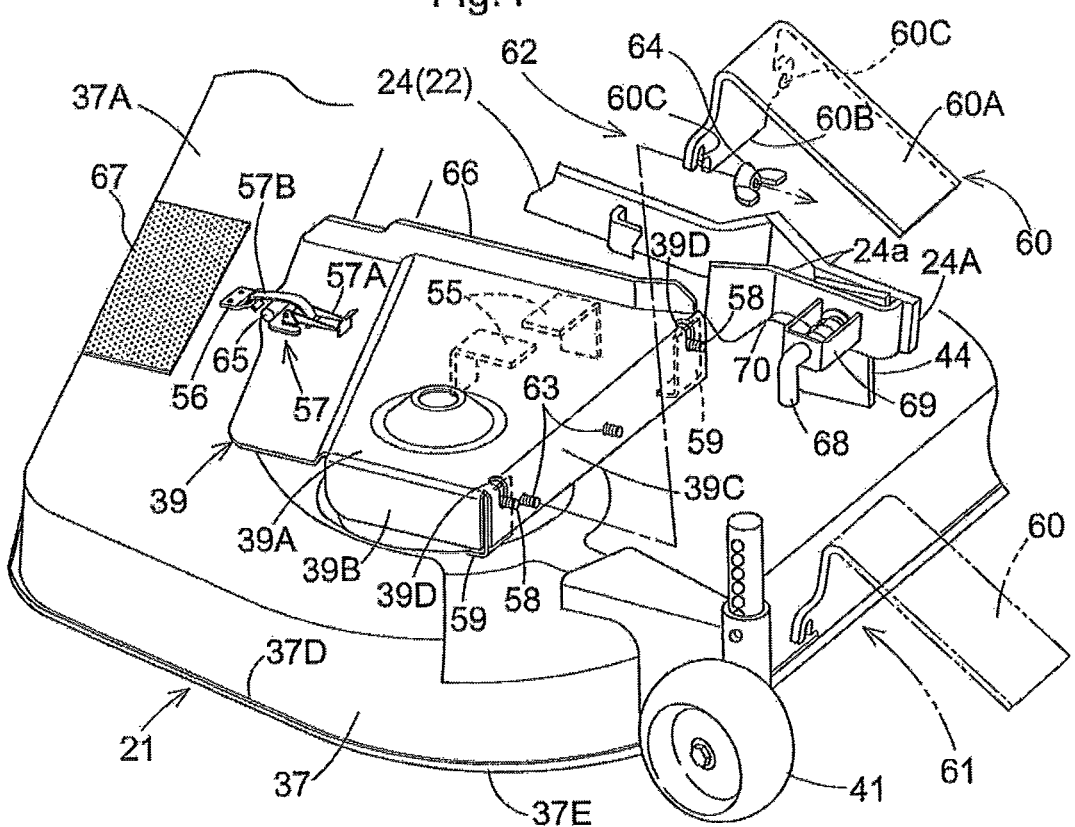
FIG. 4 is a perspective view of the relevant parts that shows the attachment-detachment structure of the climb-up assist member with respect to the mower unit.
Figure 5:
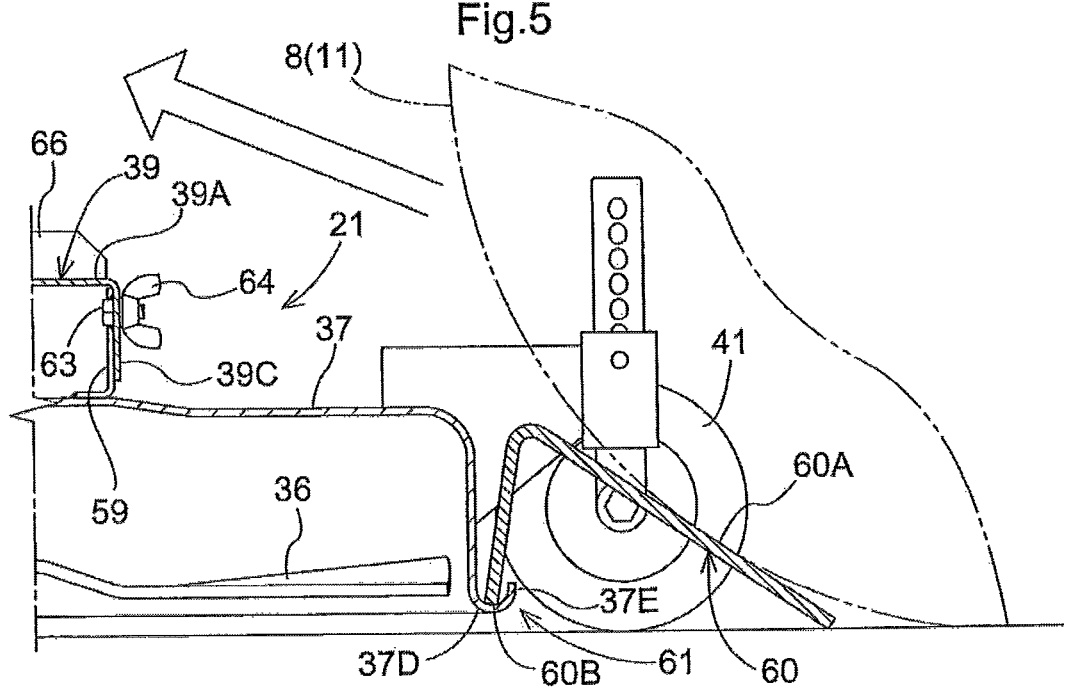
FIG. 5 is a longitudinal side view of the relevant parts that shows the operation of the climb-up assist member.
Figure 6:
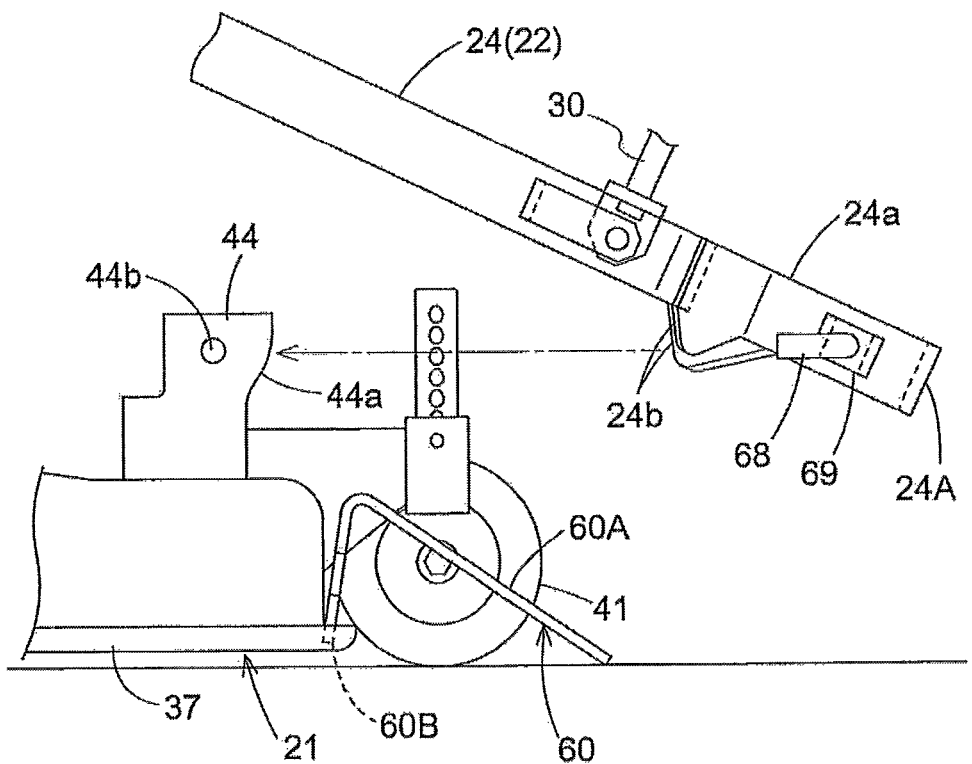
FIG. 6 is a side view of the relevant parts that shows the connecting structure between the second link and the second bracket.
Figure 7:
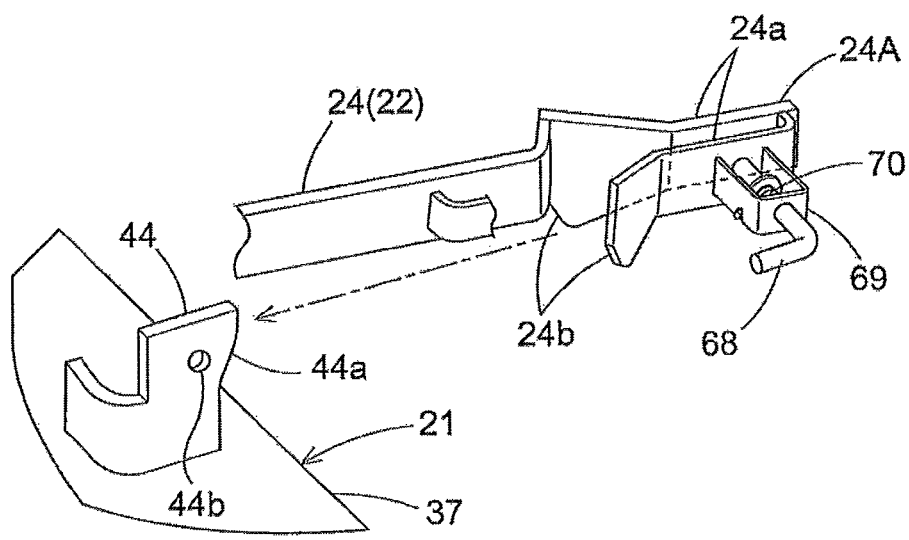
FIG. 7 is a perspective view of the relevant parts that shows the connecting structure between the second link and the second bracket.

As shown in FIGS. 2 through 4, in the left and right transmission covers 39, a round bar member 65 is welded facing to the left and right in a position below the engaging part 57B in the ceiling wall 39A. Through this configuration, when the wheels 8, 11 of the tractor 1 roll from the transmission covers 39 to the front upper part 37A of the mower deck 37, deformation of the engaging part 57B due to running over of the engaging part 57B can be prevented, and the engaging part 57B and the engaged fixture 56 can be prevented from disengaging from each other due to this deformation.

As shown in FIGS. 2 through 5, in the left and right transmission covers 39, a reinforcing member 66 extending to the front and rear of the ceiling wall 39A is welded at the inner end of the ceiling wall 39A. This configuration makes it possible to suppress misalignment of the left and right wheels 8, 11 to the left and right in relation to the left and right transmission covers 39 when the tractor 1 climbs over the mower unit 21, while increasing the strength of the left and right transmission covers 39.

In the mower deck 37 as shown in FIGS. 2 through 4, plate-shaped anti-slip members 67 are provided in front of the left and right transmission covers 39 in the front upper parts 37A of the mower deck 37. The left and right anti-slip members 67 can thereby be used as references when the left and right front wheels 8 are caused to climb over the mower unit 21 in forward travel, and the left and right front wheels 8 can be easily and reliably caused to climb over the mower unit 21 by forward travel. Slippage of the wheels 8, 11 with respect to the mower deck 37 that can occur when the wheels 8, 11 of the tractor 1 descend onto the ground from the front upper part 37A of the mower deck 37 can also be suppressed by the left and right anti-slip members 67. As a result, the mower unit 21 can be prevented from being abruptly pushed to the rear by slippage.

In the mower deck 37 as shown in FIGS. 2 through 7, the upper rear edge parts 44a of the left and right second brackets 44 are curved so as to approach the front of the machine body towards the lower side. In the left and right second links 24, the free end parts 24A connected by a pin to the corresponding second brackets 44 are formed so that, when viewed from above, the parts have a substantial bracket shape that opens towards the front of the machine body, and the front parts of the left and right side wall portions 24a thereof are formed so as to separate from each other towards the front. The front parts of the left and right side wall portions 24a extend further downward than the rear parts, and the lower front edge parts 24b of the extending front parts are formed in a forward-tilting orientation positioned to the front towards the upper sides thereof. When the aforementioned cutting height adjustment mechanism 35 is operated, and the lower-limit height position of the left and right second links 24 is set to the height position for attachment to the mower unit 21, the left and right lower front edge parts 24b in the left and right second links 24, and the upper rear edge parts 44a of the left and right second brackets 44 are set to a height position at which contact can be made.

According to this configuration, in a case in which the mower unit 21 is attached to the lower middle portion of the tractor 1, the tractor 1 is moved forward so that the left and right front wheels 8 thereof climb over the mower unit 21 via the left and right climb-up assist members 60 in a state in which the lower-limit height of the left and right second links 24 is set to the height position for attachment to the mower unit 21. At this time, when misalignment occurs within the allowable range in the left-right direction between the left and right second brackets 44 and the free end parts 24A of the left and right second links 24, the rearward pressure on the mower unit 21 that occurs when the left and right front wheels 8 descend onto the ground from the front upper part 37A of the mower deck 37 can be utilized to cause any of the left and right lower front edge parts 24b in the left and right second links 24 to come in contact in intersecting fashion with the upper rear edge parts 44a of the corresponding second brackets 44 without the inconvenience that occurs when the mower unit 21 travels forward together with the forward travel of the tractor 1, and the lower front edge part 24b can be slid and guided to the proper position in the left-right direction by the corresponding upper rear edge parts 44*a*. The corresponding second brackets 44 can thereby be reliably and automatically engaged between the left and right side wall portions 24*a* and the free end parts 24A of the left and right second links 24 in conjunction with the climbing over of the mower unit 21 by the tractor 1.

After this automatic engagement, the rear ends of the free end parts 24A in the left and right second links 24 make contact with the upper rear edge parts 44*a* of the corresponding second brackets 44, whereupon engaging pins 68 provided to the left and right second links 24, and engaging holes 44*b* formed in the left and right second brackets 44 are set so as to face each other. In this facing state, the engaging pins 68 fixed in the engagement release position are operated against the urging of a push spring 70 through engaging with a support member 69, and when the engagement with the support member 69 is released, the free end parts 24A of the left and right second links 24 can easily by connected by the pins to the corresponding second brackets 44.

When the mower unit 21 is removed from the lower middle part of the tractor 1, the engaging pins 68 are engaged with the support member 69 against the urging of the push spring 70, after which the free end parts 24A in the left and right second links 24 are separated upward from the corresponding second brackets 44 when the left and right second links 24 are pivoted upward by the action of a hydraulic cylinder, and the free end parts 24A can be positioned at the height position that allows the left and right rear wheels 11 of the tractor 1 to climb over the mower unit 21.

Other Embodiments

[1] The work vehicle 1 to which the present invention is applied is not limited to a tractor insofar as the mower unit 21 can be detachably provided between the front wheels 8 and the rear wheels 11 of the work vehicle.

[2] The mower unit 21 may be configured to a rear-discharge specification in which discharge takes place from a discharge vent 37C formed at the rear end via a front upper part 37A or other internal passage 37B in the mower deck 37 through a conveying airflow that is generated in conjunction with the rotation of the blades.

[3] The mower unit 21 may be configured to a mulching specification in which cut grass that is cut by the blades is circulated inside the mower deck 37 and finely cut, and then dropped to the ground surface below from an opening in the bottom of the mower deck 37.

[4] The mower unit 21 may have a shaft transmission configuration in which the drive force from the work vehicle 1 is transmitted to the rotation shaft 36A of the blades 36 via a bevel gear, a transmission shaft, or the like.

[5] The mower unit 21 may be configured so that two blades, or four or more blades, are provided in the mower deck 37.

[6] The mower unit 21 may be configured to have an inclined surface that tilts between the upper rear end part of the mower deck 37 and the upper rear end parts of the transmission covers 39. A mower unit 21 having a difference in level between the front end part of the mower deck 37 and the front end parts of the transmission covers 39 may be configured to have an inclined surface that tilts between the upper front end part of the mower deck 37 and the upper front end parts of the transmission covers 39.

[7] The mower unit 21 may have a configuration in which the folded part 37E is not formed in the lower edge 37D of the mower deck 37.

[8] The first connecting means 61 may be configured so that the climb-up assist members 60 are detachably connected to the mower unit 21 by bolts/nuts in the service position.

[9] The first connecting means 61 may be configured so that the climb-up assist members 60 are detachably connected only in the service position set on the rear side of the mower unit 21, or so that the climb-up assist members 60 are detachably connected only in the service position set on the front side of the mower unit 21.

[10] The second connecting means 62 may have a releasable engaging configuration composed of engaging parts provided to the climb-up assist members 60, and an engaged part provided to the mower unit 21.

[11] A configuration may be adopted in which a connecting means 62 is provided to the work vehicle for setting the storage position of the climb-up assist members 60, and detachably connecting the climb-up assist members 60 with respect to the work vehicle in the storage position. An accommodating part for accommodating the climb-up assist members 60 so as to allow removal and installation may also be provided to the work vehicle.

Figure 8:
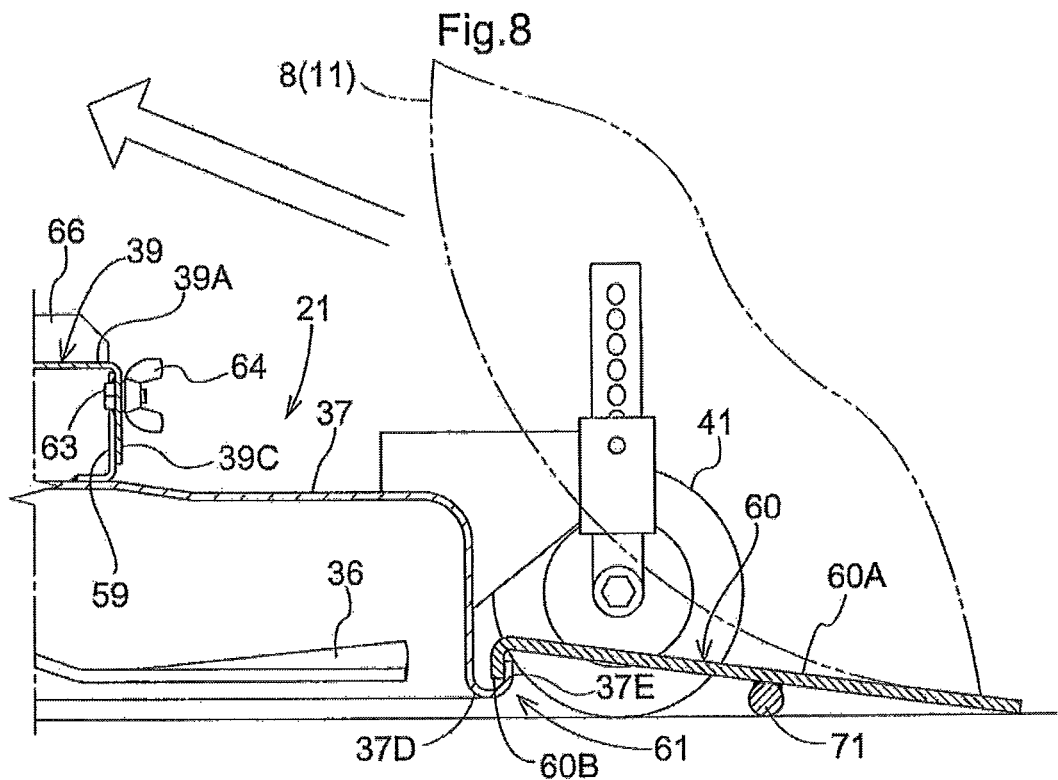
FIG. 8 is a longitudinal side view showing the relevant parts of the structure according to another embodiment.

[12] As shown in FIG. 8, the climb-up assist members 60 may be formed so as to have a large difference in level between the upper end parts of the inclined surfaces 60A and the upper part of the mower deck 37 in the service position. In this configuration as well, since the climb-up assist members 60 are connected to the mower unit 21 via the first connecting means 61 in the service position, when the left and right front wheels 8 or the left and right rear wheels 11 roll onto the rear upper part (or front upper part) of the mower deck 37 from the inclined surfaces 60A of the corresponding climb-up assist members 60, even when the mower unit 21 is pushed away from the climb-up assist members 60 by the front wheels 8 or the rear wheels 11, the mower unit 21 is prevented from moving along with the climb-up assist members 60, whose movement is prevented by the pressure of the front wheels 8 or the rear wheels 11. As a result, the smoothness of the climb-up over the mower unit 21 can be prevented from being adversely affected by separation of the mower unit 21 from the climb-up assist members 60.

The reference numeral 71 shown in FIG. 8 indicates a round steel reinforcing member that is welded to the back surfaces of the inclined surfaces 60A so as to touch the ground in the service position.

Figure 9:
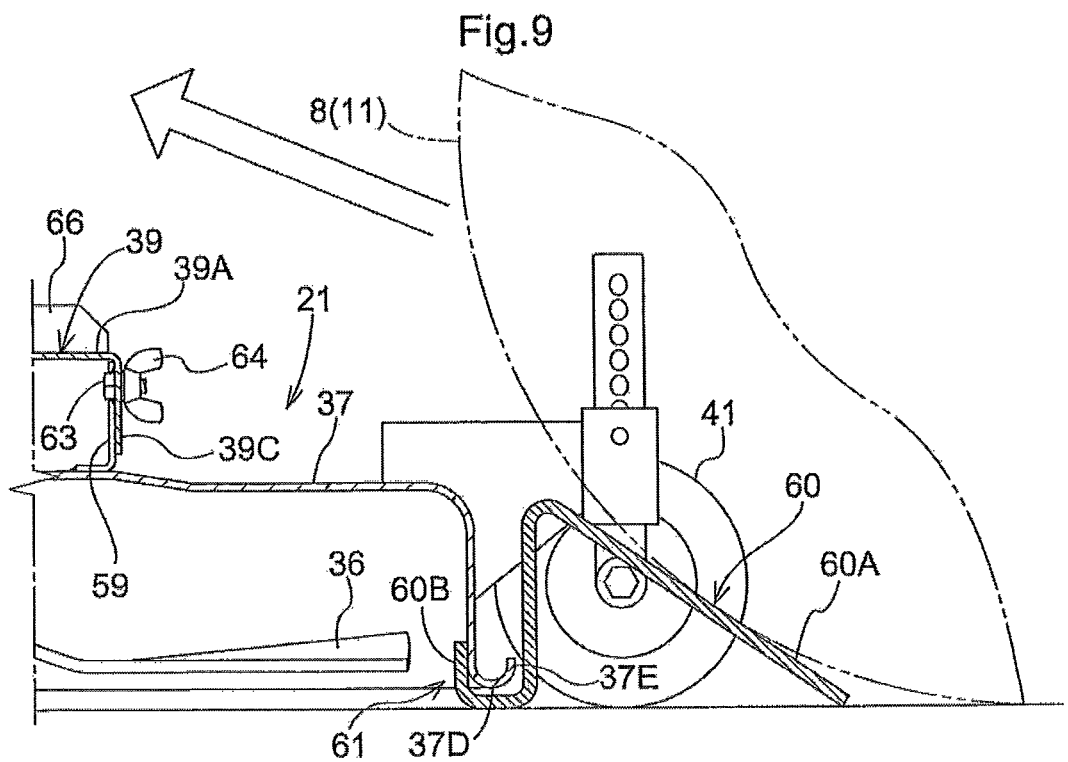
FIG. 9 is a partial side view showing the relevant parts of the structure according to another embodiment.

[13] As shown in FIG. 9, the edge parts (engaging parts) 60B on the short sides of the climb-up assist members 60 may be formed so as to engage with the lower edge 37D of the mower deck 37 from below. In other words, in this case, the first connecting means (connecting means described in claims 1 and 2) 61 is composed of the lower edge 37D of the mower deck 37 and the edge parts 60B of the short sides of the climb-up assist members 60. In this configuration as well, when the left and right front wheels 8 or the left and right rear wheels 11 roll onto the rear upper part (or front upper part) of the mower deck 37 from the inclined surfaces 60A of the corresponding climb-up assist members 60, even when the mower unit 21 is pushed away from the climb-up assist members 60 by the front wheels 8 or the rear wheels 11, the mower unit 21 is prevented from moving along with the climb-up assist members 60, whose movement is prevented by the pressure of the front wheels 8 or the rear wheels 11. Therefore, the smoothness of climbing over the mower unit 21 can be prevented from being adversely affected by separation of the mower unit 21 from the climb-up assist members 60.

Figure 10:
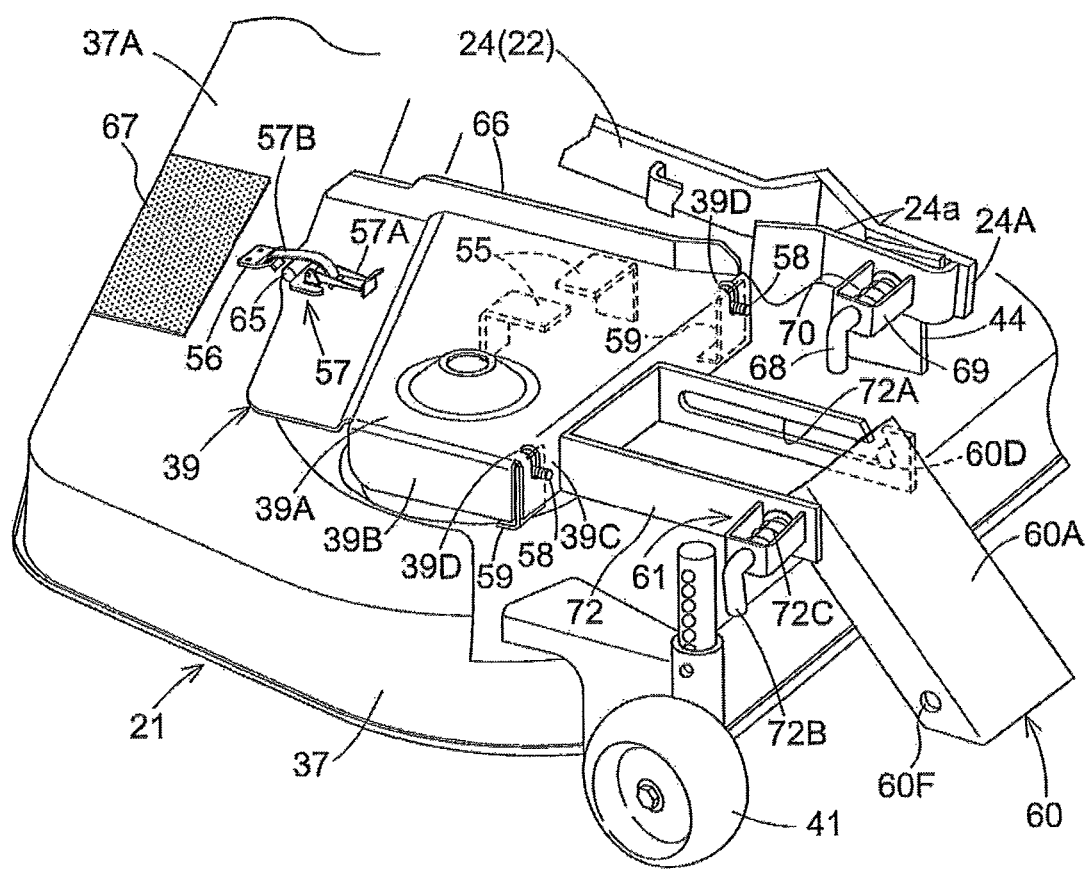
FIG. 10 is a perspective view showing the relevant parts of the structure according to another embodiment.
Figure 11:
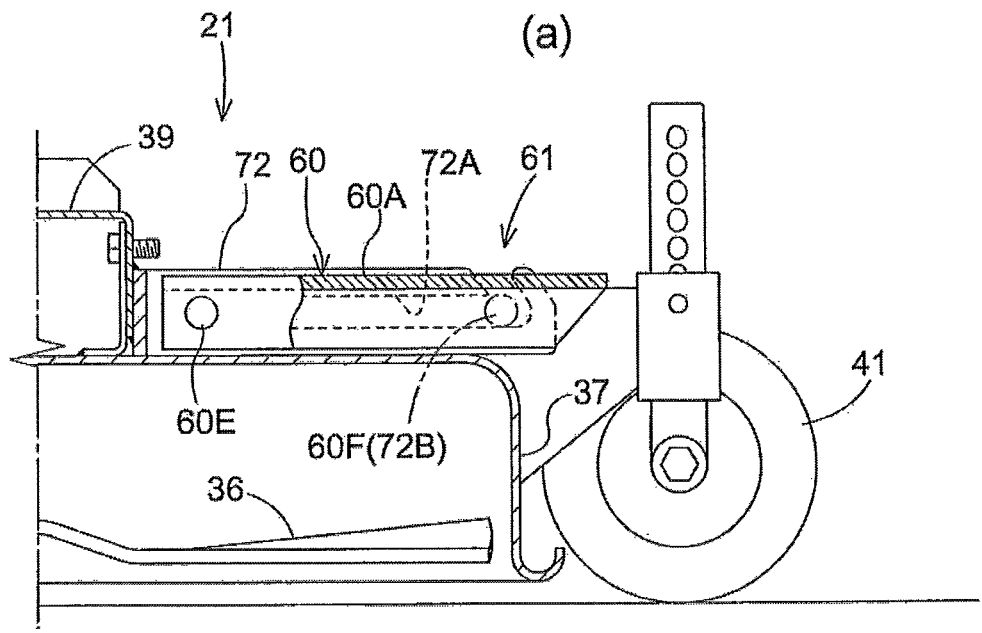
FIG. 11 is a longitudinal side view showing the relevant parts of the structure according to another embodiment.
Figure 11:
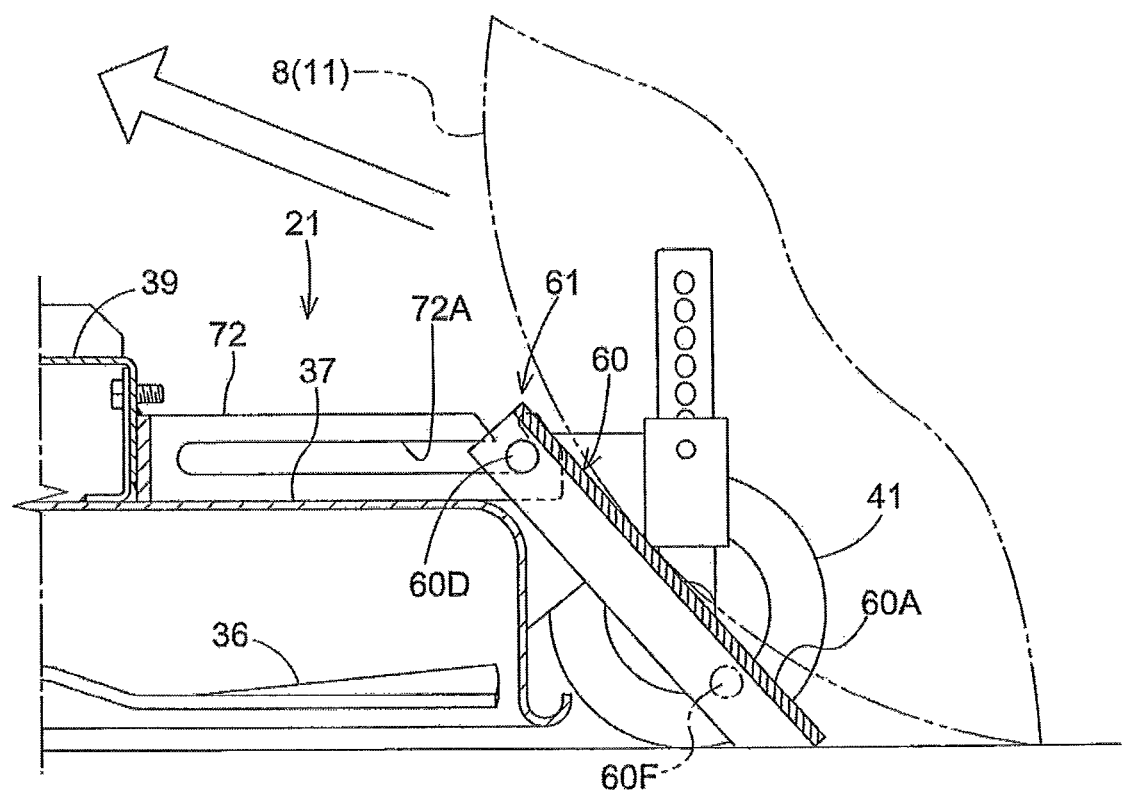

[14] As shown in FIGS. 10 and 11, the climb-up assist member 60 may be provided so as to be capable of sliding and changing position between the storage position and the service position with respect to the mower unit 21, and may be capable of being attached and detached in the service position.

Describing this configuration in more detail, as shown in FIGS. 10 and 11, the climb-up assist member 60 is formed from a steel plate having a cross-sectional shape that is curved into a bracket shape; an engaging pin 60D that protrudes outward to the right is integrally provided at the end part on the storage position side in the right-side wall; and engaging holes 60E, 60F are formed at the end part on the storage-position side and the end part on the use-position side, respectively, in the left-side wall.

In the mower unit 21, a guide member 72 formed in a bracket shape as viewed from above is integrally provided to the transmission cover 39 (or the mower deck 37); the engaging pin 60D of the climb-up assist member 60 is slid and guided forward and backward in the right-side wall of the guide member 72; a slit 72A for allowing engagement and release of the engaging pin 60D in the service position is formed in the right-side wall; and an engaging pin 72B capable of insertion and withdrawal with respect to the engaging holes 60E, 60F of the climb-up assist member 60, a spring 72C for urging the engaging pin 72B in the insertion direction with respect to the engaging holes 60E, 60F, and other components are provided to the end part on the use-position side in the left-side wall of the guide member 72.

In other words, according to this configuration, the engaging pin 60D of the climb-up assist member 60 is inserted into the slit 72A of the guide member 72 in the service position, and the engaging pin 72B of the guide member 72 is inserted into the engaging hole 60E on the storage-position side in the climb-up assist member 60, whereby the climb-up assist member 60 can be connected to the mower unit 21 (see FIGS. 10 and 11B).

In this connected state in the service position, when the engagement of the engaging pin 72B with respect to the engaging hole 60E on the storage-position side is released against the urging of the spring 72C, the climb-up assist member 60 is allowed to slide and move from the service position to the storage position, and the climb-up assist member 60 can be removed from the mower unit 21. In this state, when the climb-up assist member 60 is slid to the storage position, the engaging pin 72B of the guide member 72 is engaged in the engaging hole 60F on the use-position side in the climb-up assist member 60 by the urging of the spring 72C. The climb-up assist member 60 can thereby be locked and maintained in the storage position set at the upper part of the mower unit 21 (see FIG. 11A).

In the state in which engaging is maintained in the storage position, when the engagement of the engaging pin 72B in the engaging hole 60F on the use-position side is released against the urging of the spring 72C, the climb-up assist member 60 is allowed to slide from the storage position to the service position. In this state, the climb-up assist member 60 is slid to the service position, whereupon the engaging pin 72B of the guide member 72 is engaged in the engaging hole 60E on the storage-position side in the climb-up assist member 60 by the urging of the spring 72C. The climb-up assist member 60 can thereby be locked (or engaged) and maintained in the service position in a state of being extended towards the ground surface in the front and rear direction from the upper part of the mower unit 21 (see FIGS. 10 and 11B).

The connecting means (first connecting means) 61 for detachably connecting the climb-up assist member 60 to the mower unit 21 in the service position is composed of the engaging pin 60D provided to the climb-up assist member 60, the engaging hole 60E on the storage-position side, the slit 72A provided to the guide member 72, the engaging pin 72B, the spring 72C, and other components.

In this configuration, the climb-up assist member 60 has an extensible configuration in which a plurality of plates are connected so as to be able to extend and retract, an elongated inclined surface 60A that is more easily climbed can be formed by extending the climb-up assist member 60 in the service position, and the climb-up assist member 60 may be configured to enable compact storage by retracting the climb-up assist member 60 in the storage position.

Figure 12:
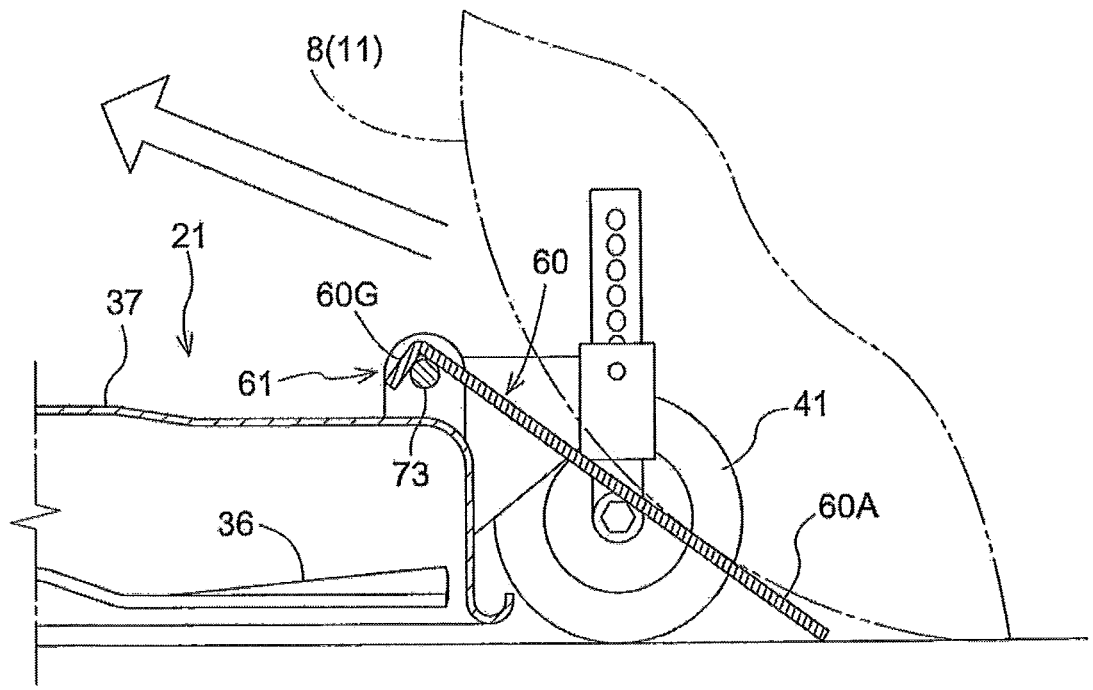
FIG. 12 is a longitudinal side view showing the relevant parts of the structure according to another embodiment.
Figure 13:
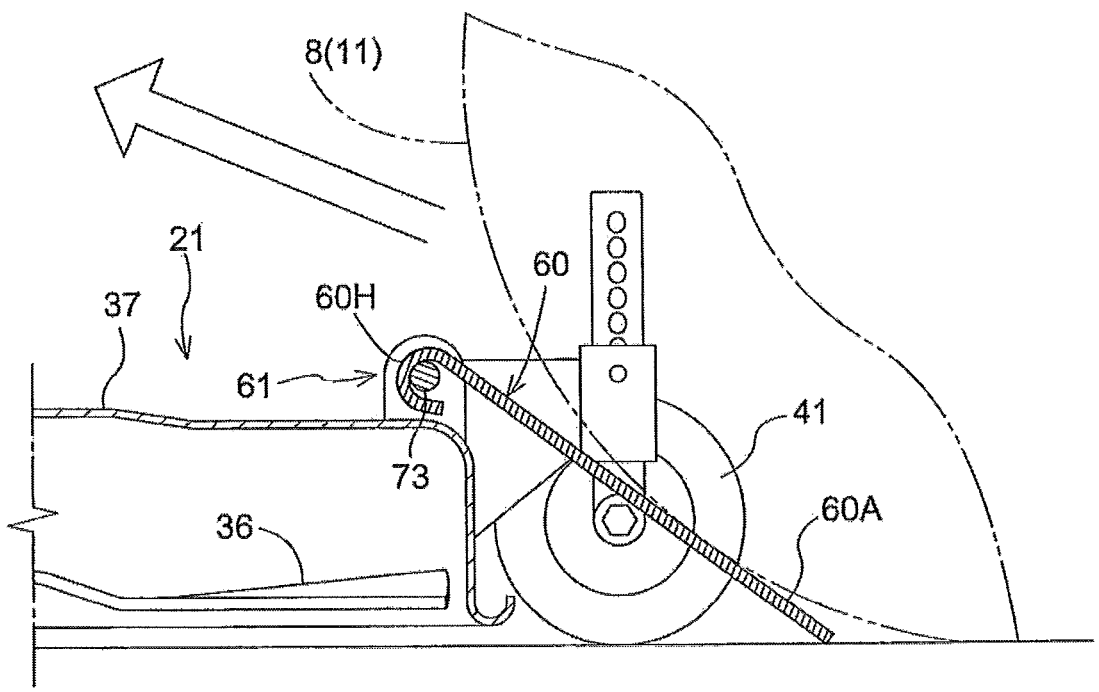
FIG. 13 is a longitudinal side view showing the relevant parts of the structure according to another embodiment.

[15] As shown in FIGS. 12 and 13, a configuration may be adopted in which the climb-up assist member 60 formed by a steel plate in which a bent part 60G (see FIG. 12) or a curved part 60H (see FIG. 13) is integrally formed at one end can be attached and detached with respect to the mower unit 21 in the service position by the engaging and releasing of the bent part 60G or the curved part 60H with respect to a round steel engaging member 73 integrally provided in a left-right orientation to the mower deck 37.

In this configuration, the connecting means (first connecting means) 61 for detachably connecting the climb-up assist member 60 to the mower unit 21 in the service position is composed of the bent part 60G or curved part 60H provided to the climb-up assist member 60, and the engaging member 73 provided to the mower deck 37.

Figure 14:
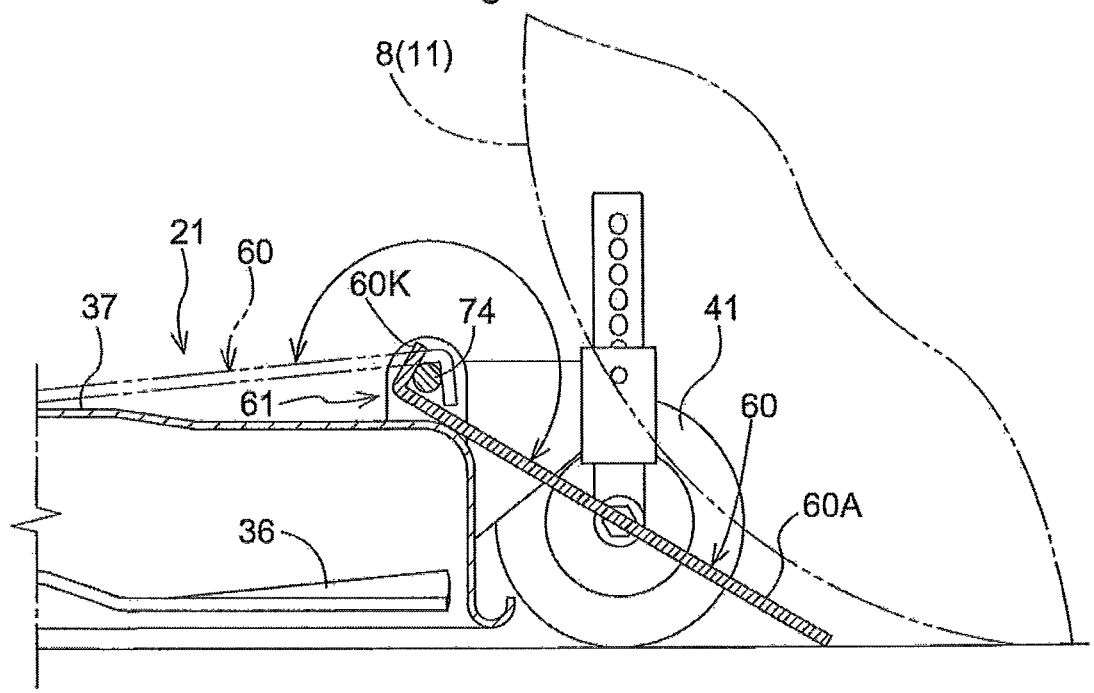
FIG. 14 is a longitudinal side view showing the relevant parts of the structure according to another embodiment.
Figure 15:
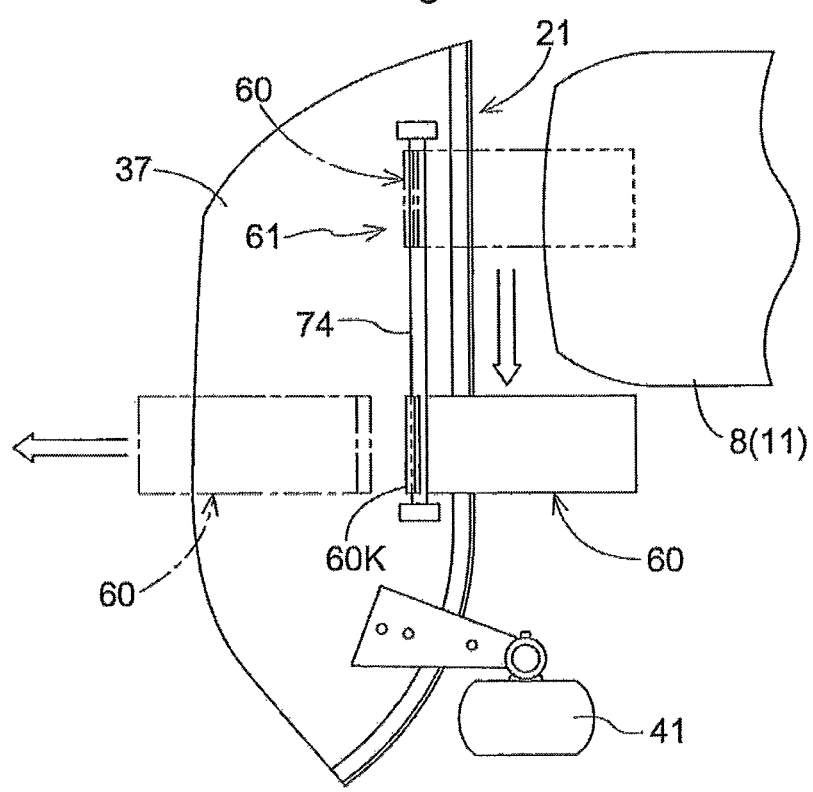
FIG. 15 is a plan view showing the relevant parts of the structure according to another embodiment.
Figure 16:
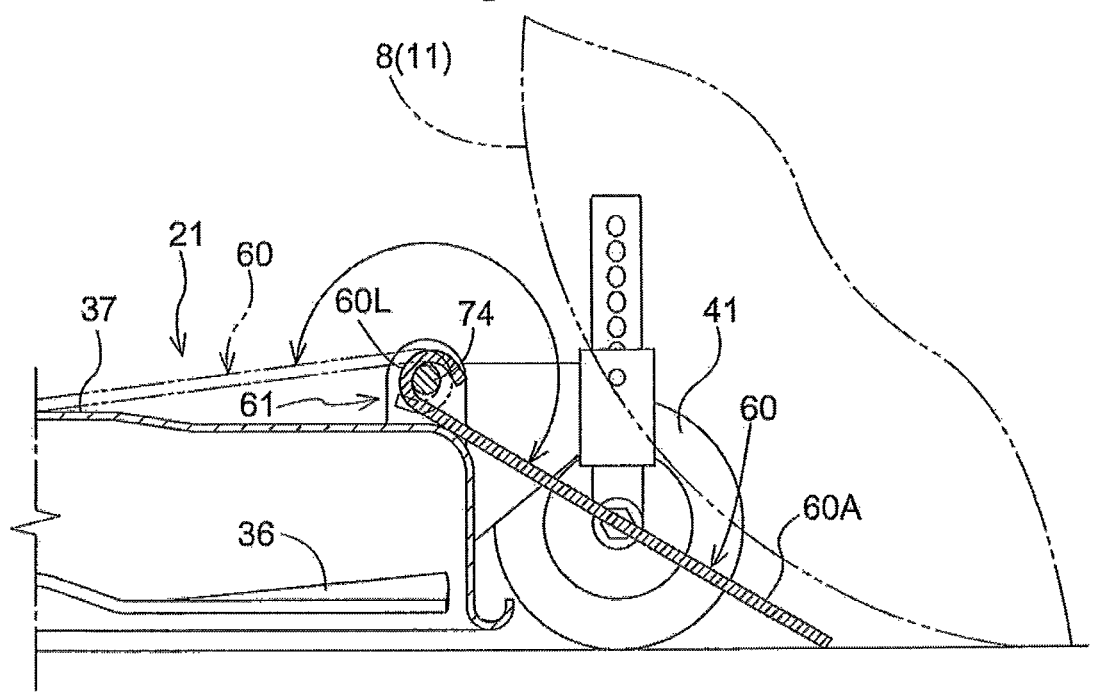
FIG. 16 is a longitudinal side view showing the relevant parts of the structure according to another embodiment.

[16] As shown in FIGS. 14 through 16, a configuration may be adopted in which the climb-up assist members 60 are provided so as to be able to slide to the left and right as well as forward and rearward with respect to the mower unit 21, and the climb-up assist members 60 can be attached and detached with respect to the mower unit 21 in a storage position set above the mower unit 21.

Describing this configuration in more detail, as shown in FIGS. 14 through 16, the climb-up assist members 60 are formed from steel plates in which a bent part 60K (see FIGS. 14 and 15) or a curved part 60L (see FIG. 16) is integrally formed at one end.

In the mower deck 37, a round steel support member 74 is provided in a left-right orientation for supporting the climb-up assist members 60 so that the climb-up assist members 60 can slide to the left and right, and in the forward-rear direction through the engagement of the bent part 60K or curved part 60L. The support member 74 is configured to have a length for slidably guiding the climb-up assist members 60 in the left-right direction between a facing position towards the inside of the vehicle body in which the climb-up assist members 60 face each other in the forward-rear direction, and a non-facing position towards the outside of the vehicle body in which the climb-up assist members 60 do not face each other in the forward-rear direction with respect to the wheels 8, 11 that climb up the mower unit 21.

The service position is set to a position in which the climb-up assist member 60 is positioned so as to face towards the inside of the vehicle body, and in which the climb-up assist member 60 extends towards the outside in the forward-rear direction from the mower unit 21.

The support member 74 and the bent part 60K or curved part 60L of the climb-up assist member 60 are configured to engage each other so that the inclined surface 60A of the climb-up assist member 60 is positioned between the mower deck 37 and the support member 74 in a state in which the climb-up assist member 60 extends towards the outside in the forward-rear direction from the mower unit 21, whereby attachment and detachment of the climb-up assist member 60 with respect to the mower unit 21 are prevented, and to engage each other so that the inclined surface 60A of the climb-up assist member 60 is positioned above the support member 74 in a state in which the entire climb-up assist member 60 is positioned above the mower unit 21, whereby attachment and detachment of the climb-up assist member 60 with respect to the mower unit 21 are allowed.

In other words, in this configuration, the climb-up assist member 60 can be prevented from accidentally separating from the mower unit 21 during climbing up of the mower unit 21 in which the climb-up assist member 60 is in the service position. When the climb-up assist member 60 needs to be replaced, the climb-up assist member 60 can be attached and detached with respect to the mower unit 21 by pivoting the climb-up assist member 60 from the service position to the storage position. Furthermore, after one of the front and rear wheels 8, 11 has climbed over the mower unit 21, when the other wheels 8, 11 approaches the climb-up assist member 60 too closely and impedes the pivoting of the climb-up assist member 60 from the service position to the storage position, the climb-up assist member 60 can be pivoted to the storage position by sliding the climb-up assist member 60 from the service position (facing position) to the non-facing position (see FIG. 15).

Figure 17:
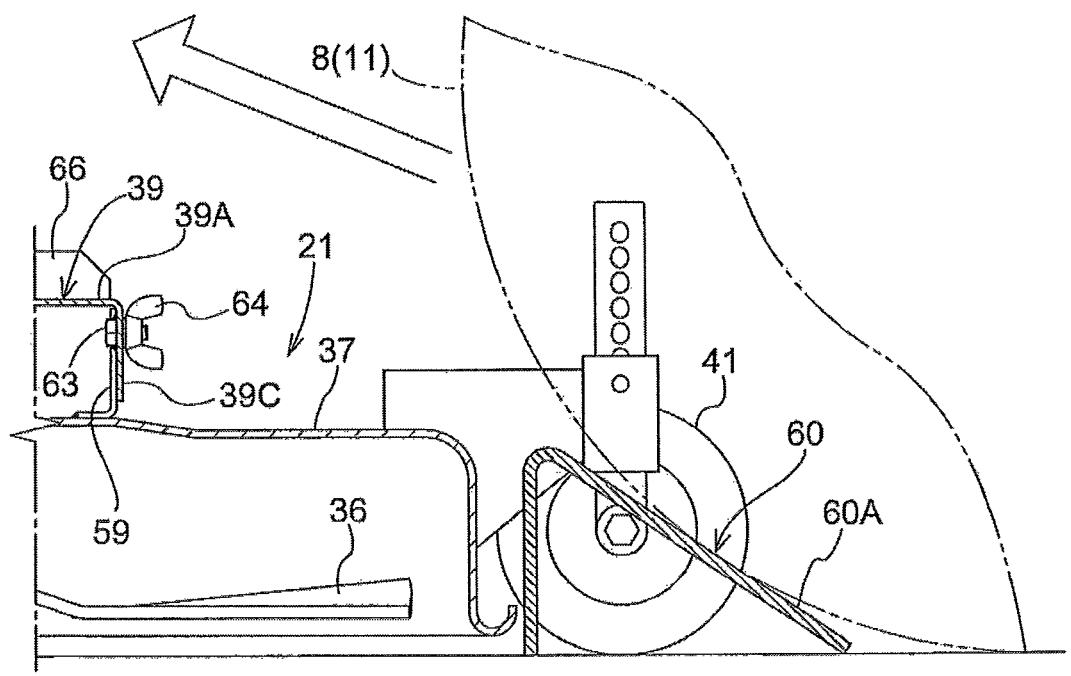
FIG. 17 is a longitudinal side view showing the relevant parts of the structure according to another embodiment.

[17] As shown in FIG. 17, the service position of the climb-up assist members 60 may be set to a position (position of no connection by the first connecting means 61) in which the climb-up assist members 60 are adjacent to the mower unit 21 so that the inclined surfaces 60A of the climb-up assist members 60 extend across the frontward ground surface from the vicinity of the upper front end part of the mower deck 37, or extend across the rearward ground surface from the vicinity of the upper rear end part of the first linking arms 27 in front of or behind the mower unit 21, and so that the left and right wheels 8, 11 that climb the inclined surfaces 60A face towards the corresponding transmission covers 39.

[18] The climb-up assist member 60 may be connected to one of the front and rear ends of the mower unit 21 (mower deck 37) via a support shaft in a left-right orientation so as to be able to pivot between the storage position above the mower unit 21, and the service position in which the climb-up assist member 60 extends to the outside in the forward-rear direction from the mower unit 21, and so that the climb-up assist member 60 can be attached and detached with respect to the mower unit 21 through insertion and withdrawal of the support shaft in each of the storage position and the service position.

Figure 18:
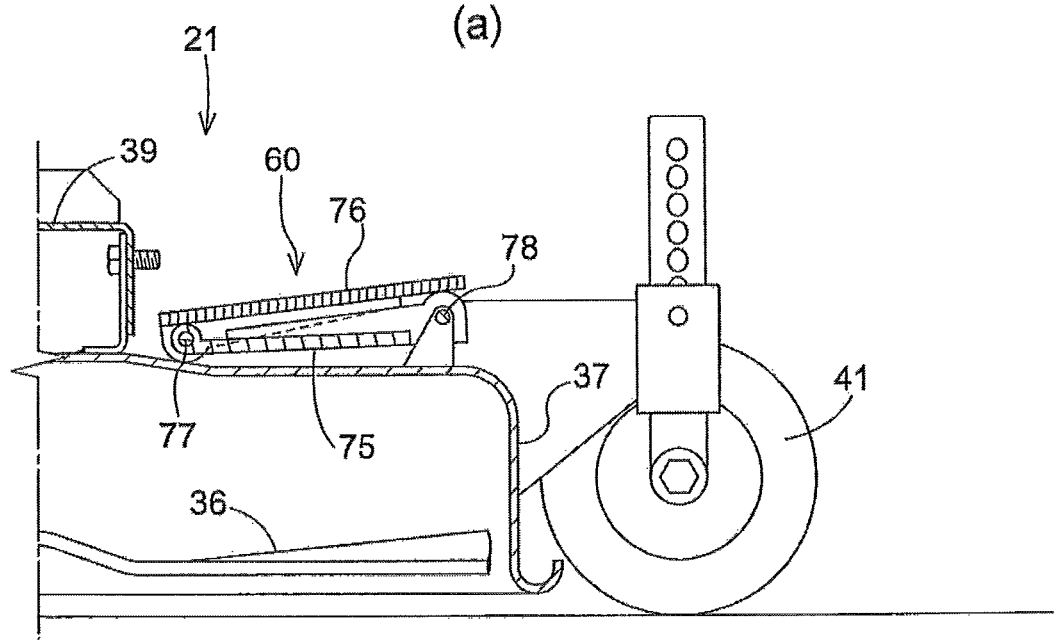
FIG. 18 is a longitudinal side view showing the relevant parts of the structure according to another embodiment.
Figure 18:
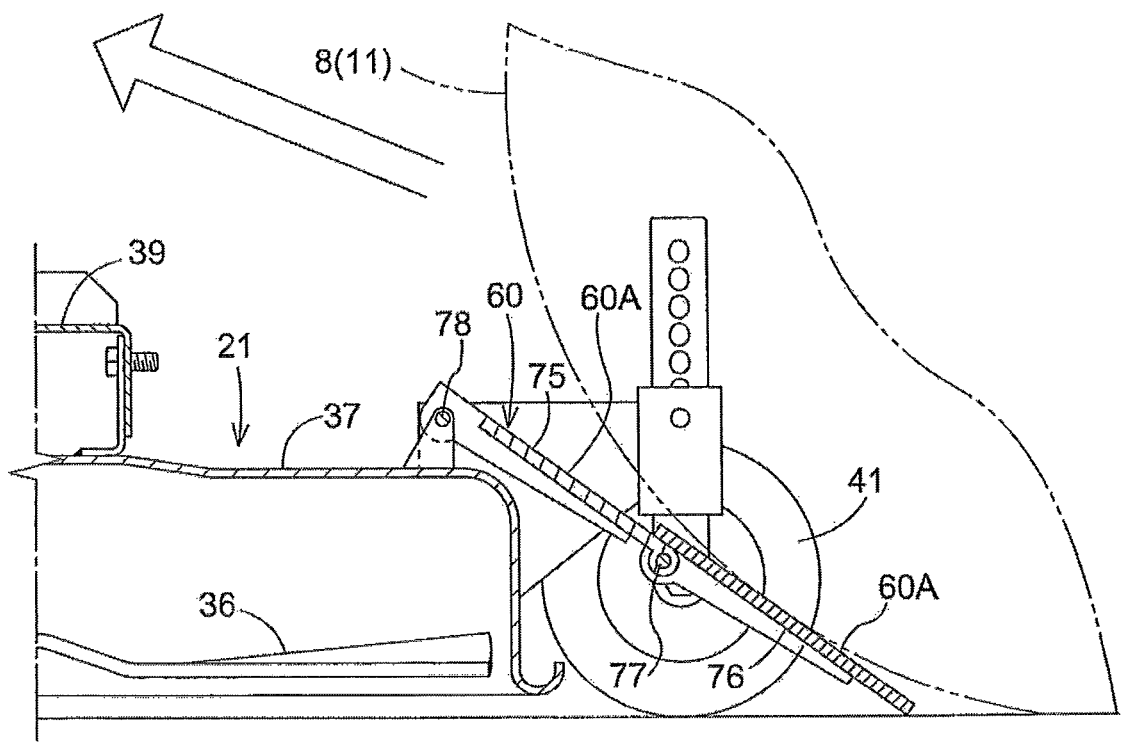

[19] As shown in FIG. 18, the climb-up assist member 60 may have a folding configuration in which two plates 75, 76 are connected so as to be able to flex and extend via a connecting shaft 77, and the climb-up assist member 60 may be connected to one of the front and rear ends of the mower unit 21 (mower deck 37) via a support shaft 78 in a left-right orientation so as to be able to pivot between the storage position above the mower unit 21, and the service position in which the climb-up assist member 60 extends to the outside in the forward-rear direction from the mower unit 21.

When the climb-up assist member 60 is endowed with a folding configuration, an elongated inclined surface 60A that is more gradually sloped and easy to climb can be formed by unfolding the climb-up assist member 60 in the service position (see FIG. 18B). When the climb-up assist member 60 is pivoted between the service position and the storage position, the climb-up assist member 60 is folded up, whereby the climb-up assist member 60 is compactly arranged, and the climb-up assist member 60 can be prevented from coming in contact with the device or the like installed in the lower middle portion of the work vehicle 1 (see FIG. 18A).

In other words, it is possible to enhance the ease of operation when the climb-up assist member 60 is pivoted between the service position and the storage position while making climbing over the mower unit 21 stable and smooth, with no sense of instability imparted to the operator.

In FIG. 18, a configuration is shown in which the climb-up assist member 60 is folded through the use of two plates 75, 76, but another configuration may also be adopted in which the climb-up assist member 60 is folded through the use of three or more plates or the like. In the service position, an elongated inclined surface 60A that is even more gently sloped and easy to climb may be formed by unfolding the climb-up assist member 60. When the climb-up assist member 60 is pivoted between the service position and the storage position, the climb-up assist member 60 may be folded up, whereby the climb-up assist member 60 can be more compactly arranged, and the climb-up assist member 60 can be prevented from coming in contact with equipment or the like installed in the lower middle portion of the work vehicle 1 regardless of the elevation position of the mower unit 21 with respect to the work vehicle 1.

The folding climb-up assist member 60 may be configured to enable attachment and detachment with respect to the mower unit 21 through the insertion and withdrawal of the support shaft 78, and so that the climb-up assist member 60 is accommodated in an accommodating part provided to the work vehicle 1.

[20] A plurality of anti-slip parts shaped as a horizontal line when viewed from above, a peak as viewed from above, an inverted peak as viewed from above, an upside-down check mark as viewed from above, or an inverted upside-down check mark as viewed from above for preventing slipping of the wheels 8, 11 may be formed so as to protrude upward in the inclined surface 60A of the climb-up assist member 60. A plurality of anti-slip parts having different shapes may also be formed so as to protrude upward in the inclined surface 60A (*2) of the climb-up assist member 60. Furthermore, an upward-protruding member may be welded to the inclined surface 60A (*2) of the climb-up assist member 60 to form an anti-slip part.

Figure 19:
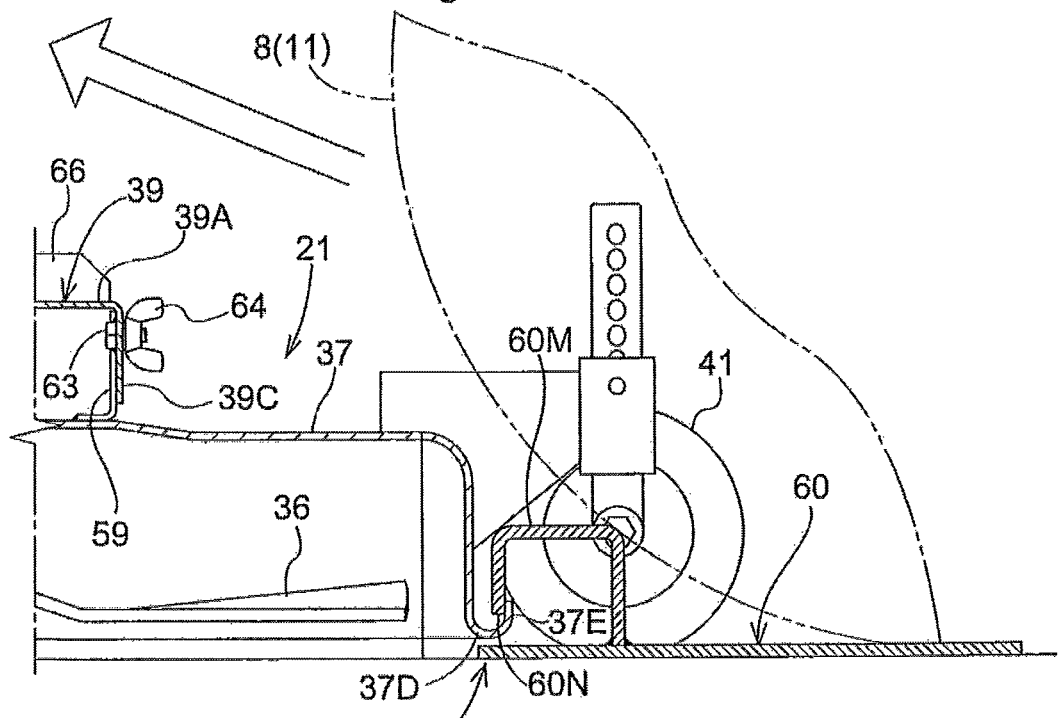
FIG. 19 is a longitudinal side view showing the relevant parts of the structure according to another embodiment.

[21] As shown in FIG. 19, the climb-up assist member 60 may be configured to have a step part 60M set to a lower height than the upper part of the mower unit 21 to assist the climbing up of the wheels 8, 11 with respect to the mower unit 21, wherein one end part 60N of the step part 60M is detachably engaged with the folded part 37E of the mower deck 37.

In this configuration, a connecting means 61 for detachably connecting the climb-up assist member 60 to the mower unit 21 in the service position in which the step part 60M assists the climbing up of the wheels 8, 11 with respect to the mower unit 21 is composed of the folded part 37E of the mower deck 37 as well as an one end part 60N of the step part 60M in the climb-up assist member 60.

During climbing over the mower unit 21, the left and right wheels 8, 11 climb up to the mower unit 21 from the step part 60M after climbing onto the corresponding step part 60M at a low height. The left and right wheels 8, 11 thereby climb over the mower unit 21 more easily than in a case in which the left and right wheels 8, 11 climb directly from the ground surface to the mower unit 21.

Even when the mower unit 21 is pushed away from the climb-up assist members 60 by the left and right wheels 8, 11 when the left and right wheels 8, 11 climb from the step parts 60M of the corresponding climb-up assist members 60 to the mower unit 21, the mower unit 21 is prevented from moving along with the climb-up assist members 60, whose movement is prevented by the pressure of the left and right wheels 8, 11. The smoothness of climbing over the mower unit 21 can therefore be prevented from being adversely affected by separation of the mower unit 21 from the climb-up assist members 60.

In this configuration, a plurality of anti-slip parts for preventing slipping of the wheels 8, 11 may be provided in protruding fashion on the upper surfaces of the step parts 60M.

Figure 20:
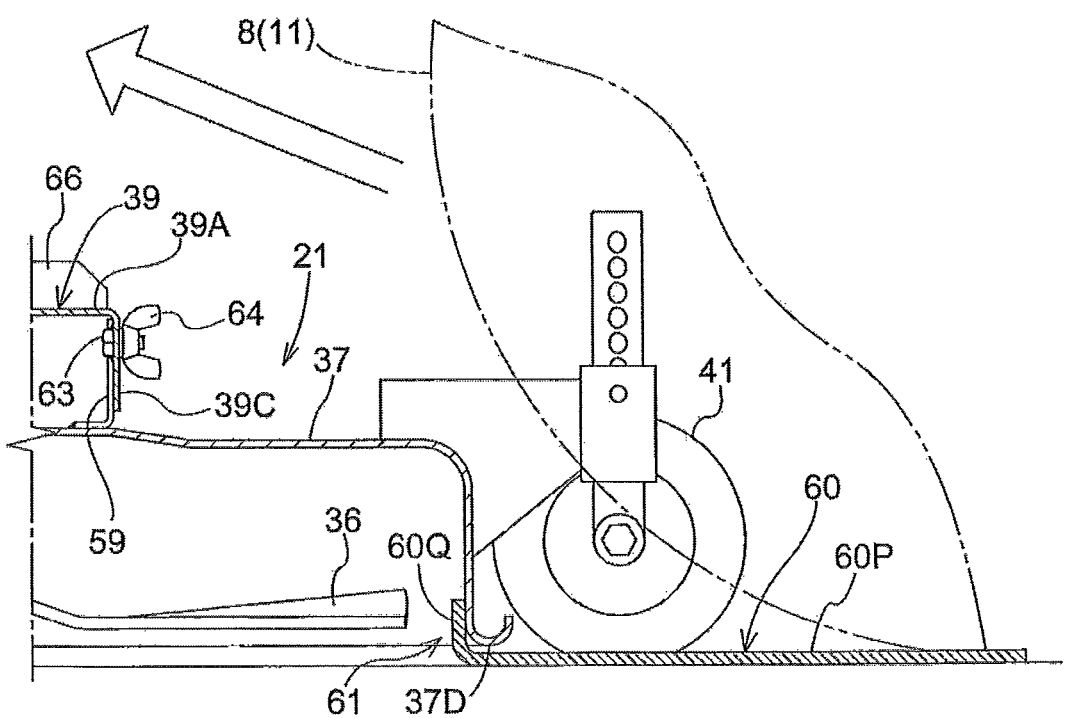
FIG. 20 is a longitudinal side view showing the relevant parts of the structure according to another embodiment.

[22] As shown in FIG. 20, the climb-up assist member 60 may be formed so as to have a travel surface 60P on which the wheels 8, 11 travel when the wheels 8, 11 climb over the mower unit 21, and to have an upright part 60Q that is engaged inside the mower deck 37 so as to act on the lower edge 37D of the mower deck 37 from the inside of the mower deck 37 in the service position.

In this configuration, the left and right wheels 8, 11 climb over the mower unit 21 while travelling on the travel surfaces 60P of the climb-up assist members 60 during climbing over the mower unit 21. When the mower unit 21 is pushed away from the climb-up assist members 60 by the left and right wheels 8, 11 in a process in which the left and right wheels 8, 11 climb over the mower unit 21, the lower edge 37D of the mower deck 37 comes in contact with the upright parts 60Q of the climb-up assist members 60 that are prevented from moving by the pressure of the left and right wheels 8, 11, and the mower unit 21 is prevented from being pushed away from the climb-up assist members 60. This configuration prevents the possibility of adverse effects on the ease of climbing over the mower unit 21 due to separation of the mower unit 21 from the climb-up assist members 60.

In this configuration, a plurality of anti-slip parts for preventing slipping of the wheels 8, 11 may be provided in protruding fashion to the travel surfaces 60P.

Figure 21:
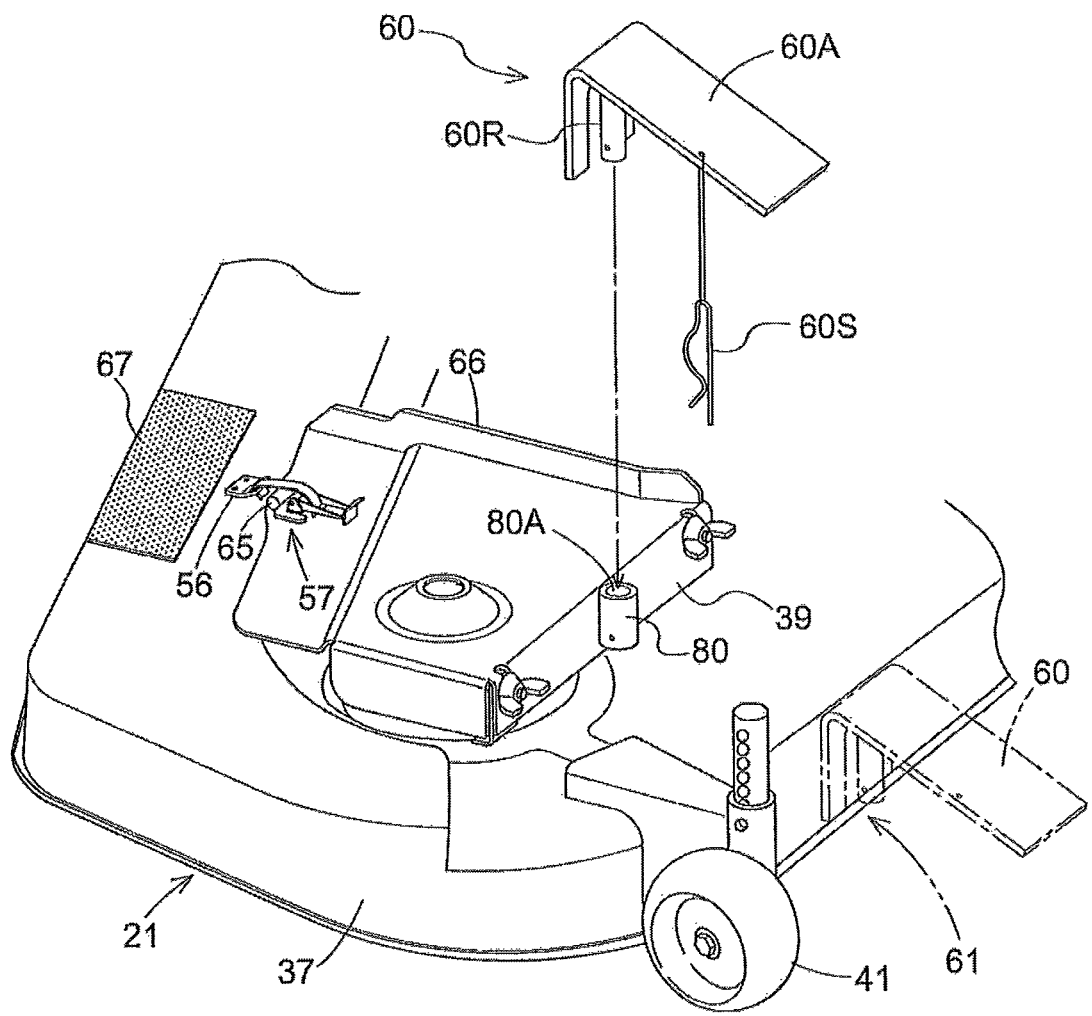
FIG. 21 is a perspective view showing the connecting means according to another embodiment.

[23] As shown in FIG. 21, the second connecting means for detachably attaching the climb-up assist members 60 in the storage position to the mower unit 21 may have a cylinder member 80 provided with a hole 80A. The cylinder member 80 is secured by welding or another publicly known method to the rear wall 39C of the transmission cover 39, or to the ceiling wall 39A of the mower deck 37. The climb-up assist member 60 has a bar member 60R that is inserted into the hole 80A. The bar member 60R is secured to the lower surface of the climb-up assist member 60 by welding or another publicly known method. The climb-up assist member 60 is secured to the mower unit 21 by insertion of the bar member 60R into the hole 80A. After the bar member 60R is inserted into the hole 80A, a beta pin 60S is inserted into a horizontally extending hole 60S that is provided to the bar member 60R, whereby the bar member 60R is prevented from escaping the hole 80A. The beta pin 60S is connected to the climb-up assist member 60 by wire or another publicly known means.

Two or more each of the cylinder member 80 and the bar member 60R may also be provided.

Figure 22:
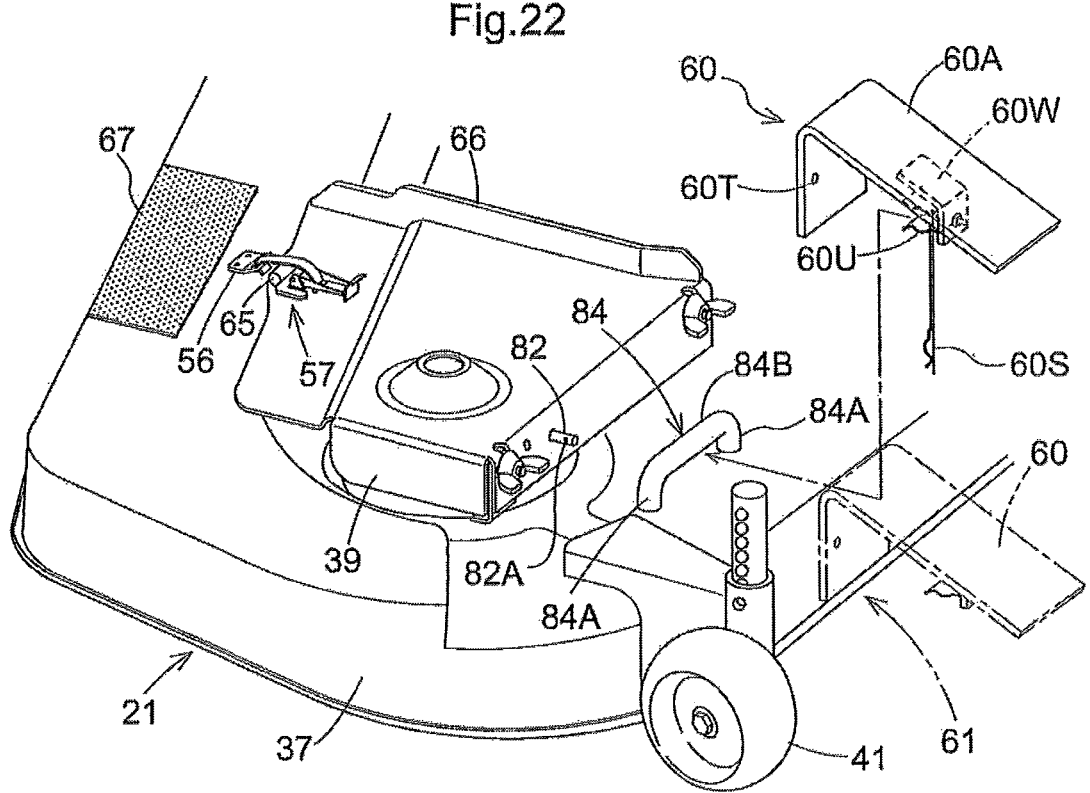
FIG. 22 is a perspective view showing the connecting means according to another embodiment.
Figure 23:
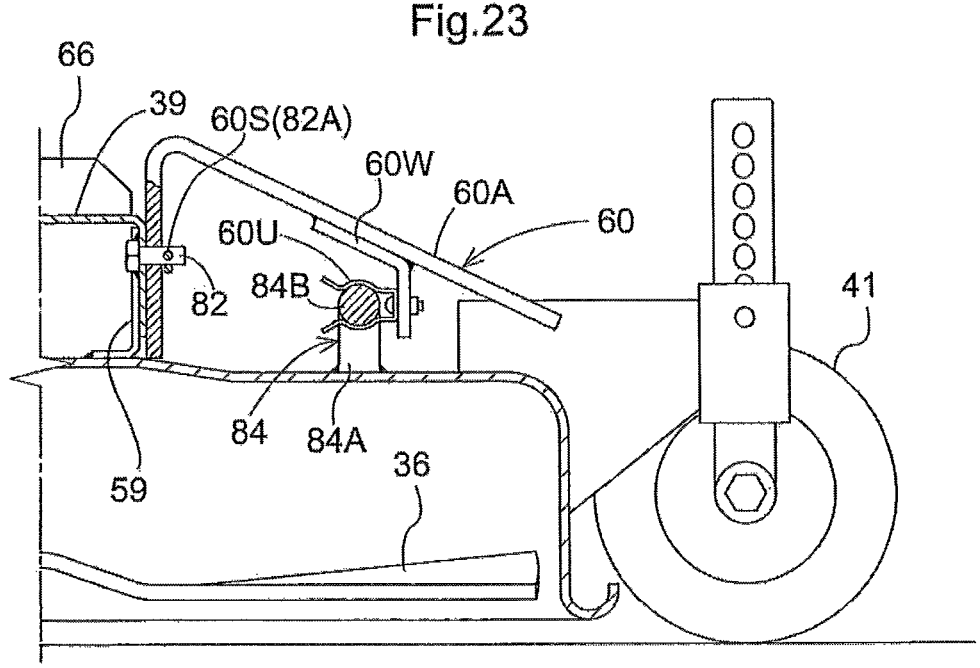
FIG. 23 is a side view showing the connecting means according to another embodiment.

[24] As shown in FIGS. 22 and 23, the second connecting means for detachably fixing the climb-up assist member 60 to the mower unit 21 in the storage position may have a protrusion 82 provided to the rear wall 39C of the transmission cover 39. A support member 84 is secured to the ceiling wall 39A of the mower deck 37 in a position to the rear of the rear wall 39C of the transmission cover 39. The support member 84 has a pair of foot parts 84A, and a horizontal member 84B for connecting the upper ends of the foot parts 84A.

A hole 60T that allows passage of the protrusion 82 is formed in the front surface of the climb-up assist member 60. As shown in FIG. 23, a bracket 60W having a vertically extending portion is secured to the lower surface of the climb-up assist member 60 by welding or another publicly known method. A pair of leaf springs 60U is attached to the front surface of the vertically extending portion of the bracket 60W. Each of the leaf springs 60U engages with the horizontal member 84B of the support member 84, and a concave part for maintaining this engagement is formed.

The protrusion 82 is inserted into the hole 60T of the climb-up assist member 60, and the pair of leaf springs 60U engages with the horizontal member 84B of the support member 84, whereby the climb-up assist member 60 is detachably retained with respect to the mower unit 21. Detachment from the protrusion 82 of the climb-up assist member 60 may then be prevented by inserting the beta pin 60S into the hole 82A of the protrusion 82.

Two or more each of the protrusion 82 and the corresponding hole 60T may be provided.

Figure 24:
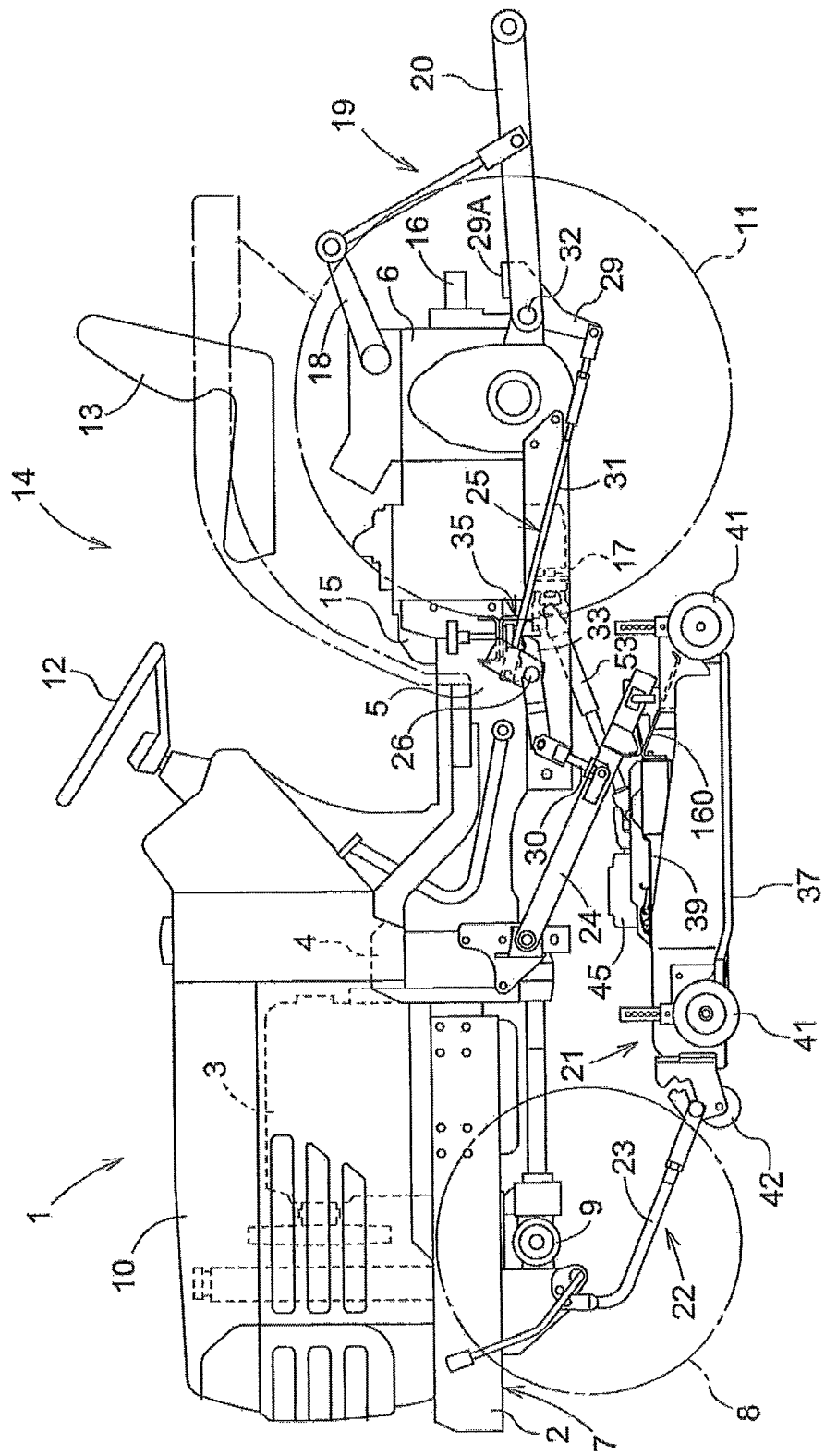
FIG. 24 is an overall side view of the tractor that shows a state in which the mower unit is installed in the tractor.
Figure 25:
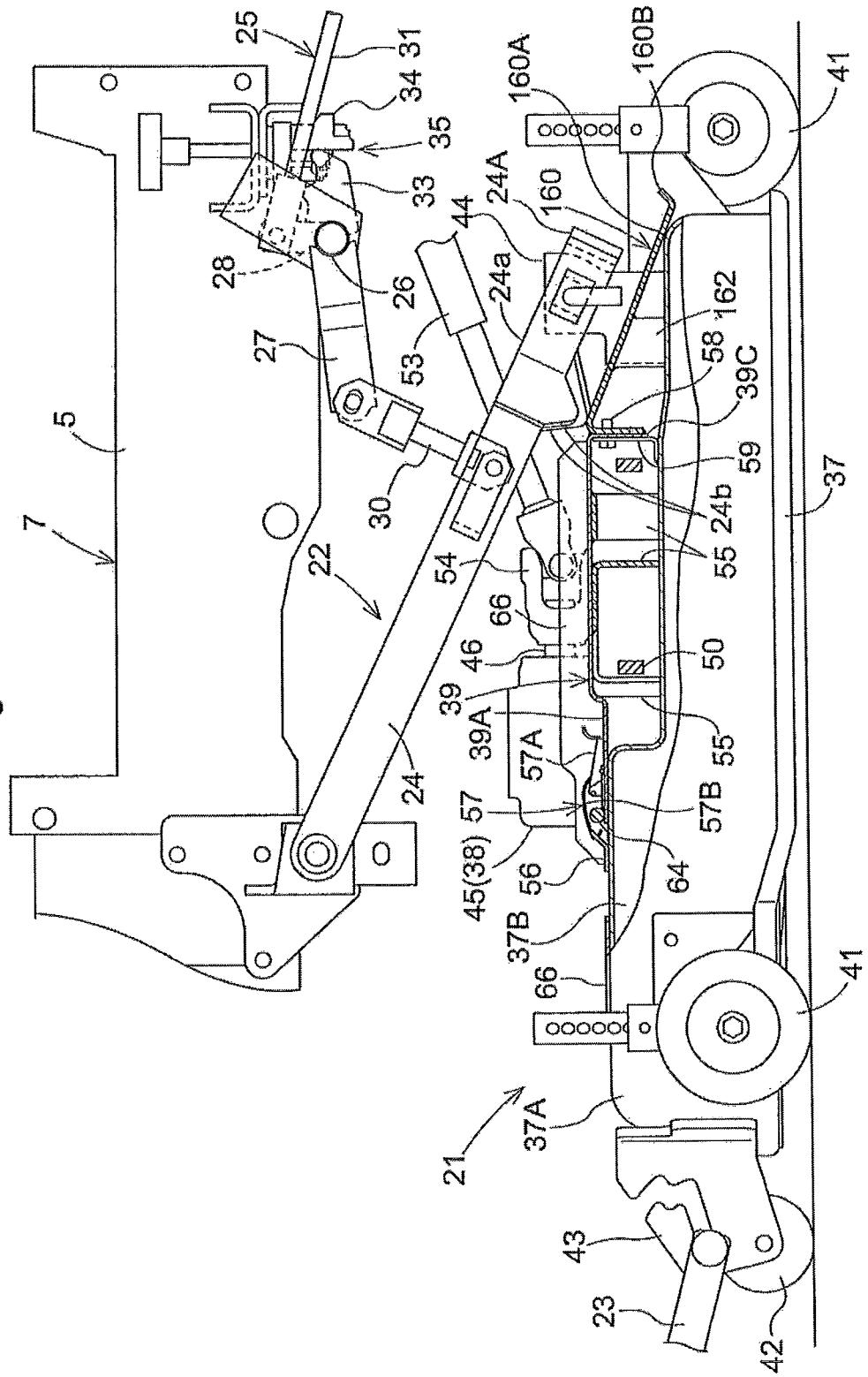
FIG. 25 is a partial side view of the relevant parts that shows the extension portion and the anti-slip portion.
Figure 26:
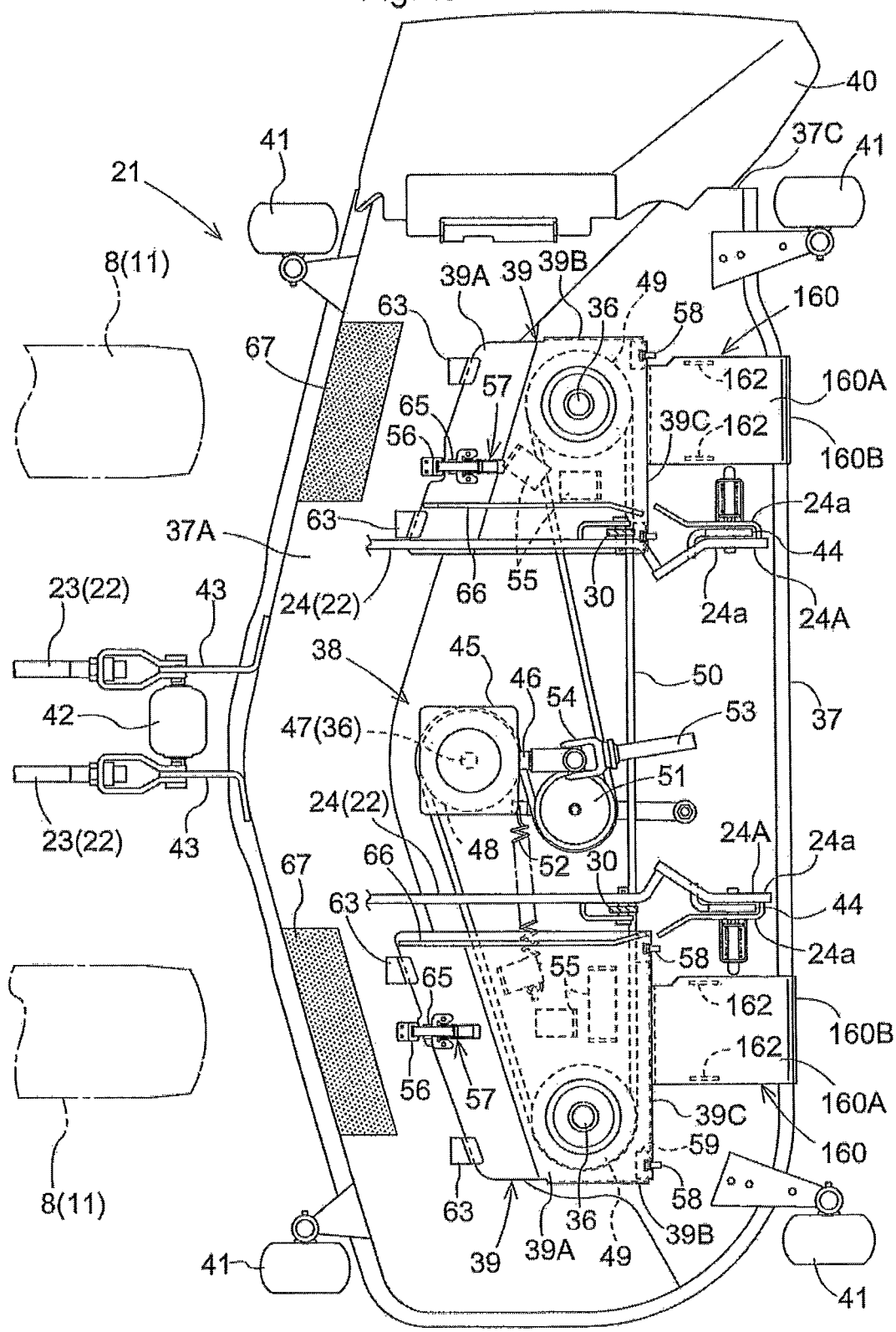
FIG. 26 is a plan view of the relevant parts that shows the extension portion and the anti-slip portion.

[25] As shown in FIGS. 24 through 26, a climb-up assist member 160 is secured to the rear wall 39C of the transmission cover 39, whereby this position can be set as the service position of the climb-up assist member 160.

The climb-up assist member 160 as an extending part that extends to the rear towards the rear end part of the mower deck 37 is welded to the rear wall 39C of the transmission cover 39. Each climb-up assist member 160 has an inclined portion 160A that gradually tilts downward and to the rear towards the rear end part of the mower deck 37 from the ceiling wall 39A of the transmission cover 39, and the rear end part 160B positioned in the vicinity of the rear end part of the mower deck 37 is formed in bent fashion so as to protrude upward. A pair of left and right foot parts 162 that make contact with the upper surface of the mower deck 37 when the transmission cover 39 is attached to the mower deck 37 are welded to the back surface of the inclined portion 160A in each climb-up assist member 160.

In a case in which the mower unit 21 is attached to the lower middle portion of the tractor 1 from this configuration, when the tractor 1 is moved forward so that the left and right front wheels 8 face towards the left and right climb-up assist members 160 provided to the mower 21, the left and right front wheels 8 catch upon reaching the rear end parts 160B of the corresponding climb-up assist members 160, and the mower deck 37 can be rapidly climbed up in a state in which slipping with respect to the mower deck 37 is prevented by this catching. When the forward motion of the tractor 1 is continued after this climbing, the left and right front wheels 8 ascend the inclined portions 160A of the corresponding climb-up assist members 160, climb up the transmission covers 39, transfer from the transmission covers 39 to the front upper part 37A of the mower deck 37, and descend onto the ground surface from the front upper part 37A of the mower deck 37. Through this operation, the mower unit 21 can be positioned between the left and right front wheels 8 and the left and right rear wheels 11 in the tractor 1, and the mower unit 21 can be attached to the lower middle portion of the tractor 1.

In the case of detaching the mower unit 21 from the lower middle portion of the tractor 1, when the tractor 1 is moved forward after releasing the attachment of the mower unit 21 to the tractor 1, the left and right rear wheels 11 catch upon reaching the rear end parts 160B of the corresponding climb-up assist members 160, and the mower deck 37 can be rapidly climbed up in a state in which slipping with respect to the mower deck 37 is prevented by this catching. When the forward motion of the tractor 1 is continued after this climbing, the left and right rear wheels 11 ascend the inclined portions 160A of the corresponding climb-up assist members 160, climb up the corresponding transmission covers 39, transfer from the transmission covers 39 to the front upper part 37A of the mower deck 37, and descend onto the ground surface from the front upper part 37A of the mower deck 37. Through this operation, the mower unit 21 can be positioned behind the tractor 1.

In other words, by implementing the simple and inexpensive modification of merely providing the climb-up assist members 160 to the left and right transmission covers 39, the rear end portions 160B of the left and right climb-up assist members 160 can be made to function as anti-slip members for preventing the wheels 8, 11 of the tractor 1 from slipping when the mower 21 is attached and detached with respect to the lower middle portion of the tractor 1. Since the inclined portions (front side portions) 160B positioned further forward than the rear end parts 160B in the climb-up assist members 160 smoothly connect so that there is no difference in level between the mower deck 37 and the transmission covers 39, the left and right front wheels 8 or the left and right rear wheels 11 can be made to rapidly climb over the mower 21 merely by moving the tractor 1 forward. As a result, there is no need for the manual labor of carrying the mower 21 to the lower middle portion of the tractor 1, or of carrying the mower 21 out from the lower middle portion of the tractor 1, and the positional relationship between the tractor 1 and the mower unit 21 can be easily and appropriately modified.

A conventional mower (not shown) in which a conventionally structure transmission cover (not shown) not provided with a climb-up assist member 160 is attached can be easily and inexpensively modified to a climbable configuration that allows climbing over by the tractor 1, merely by replacing the conventionally structured transmission cover detachably attached to the upper part of the mower deck 37 with the transmission cover 39 based on the present invention, so as to facilitate maintenance of the transmission mechanism 38 while preventing adherence of cut grass and the like to the transmission mechanism 38 for driving the cutting blades that is provided to the upper part of the mower deck 37, in the same manner as the transmission cover 39 based on the present invention.

Figure 27:
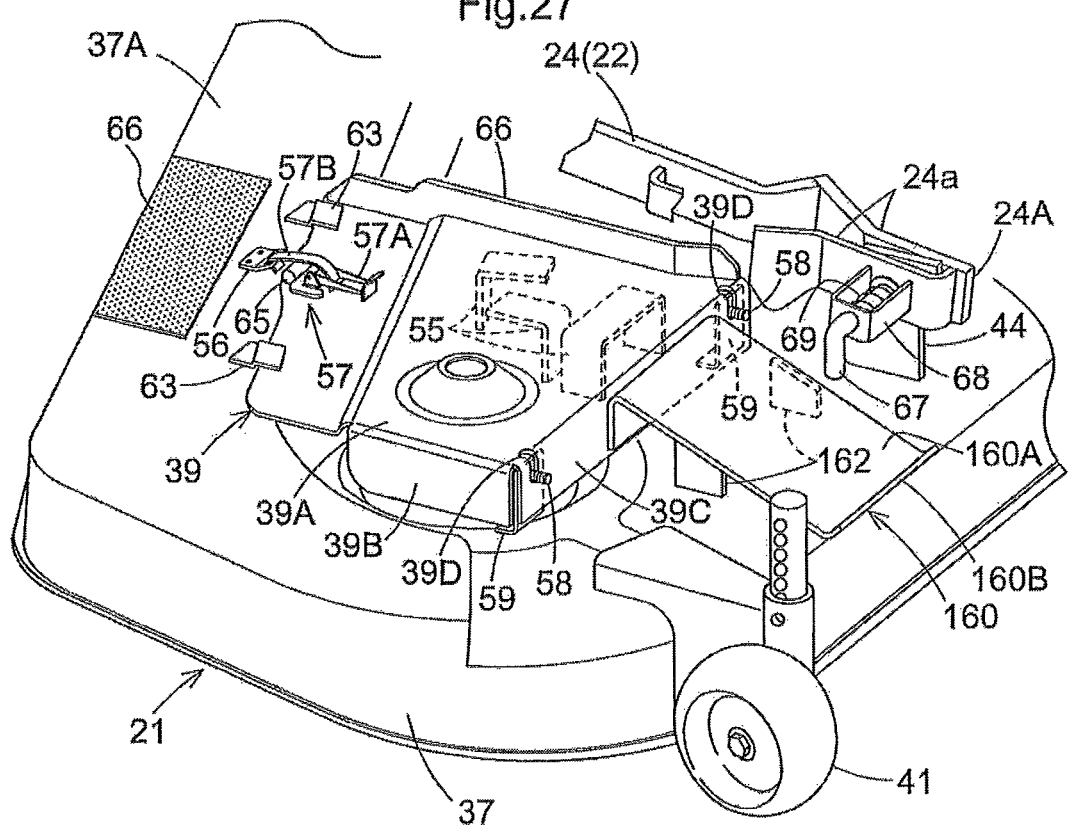
FIG. 27 is a perspective view of the relevant parts that shows the extension portion and the anti-slip portion.
Figure 28:
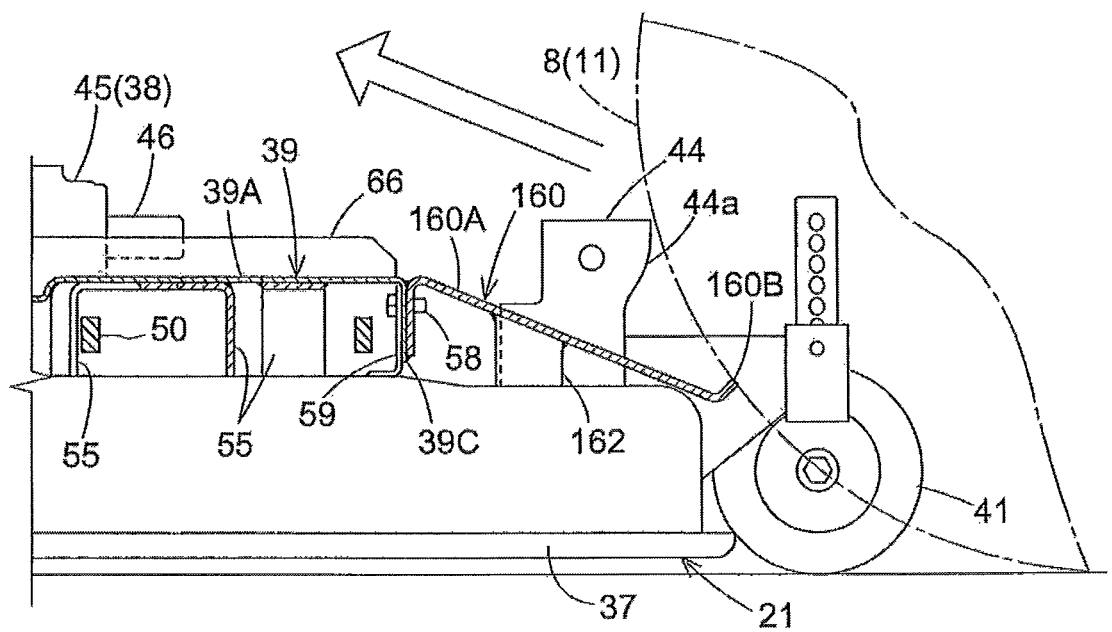
FIG. 28 is a partial side view of the relevant parts that shows the operation of the anti-slip portion.

As shown in FIGS. 26 and 27, when the transmission covers 39 are attached to the mower deck 37, pairs of engaging tabs 63 on the left and right for joining with the upper surface of the front end parts in the ceiling walls 39A of the corresponding transmission covers 39 are welded to the front upper part 37A of the mower deck 37. According to this configuration, the front ends of the transmission covers 39 can be reliably prevented from rising up from the front upper part 37A of the mower deck 37 due to recoil when the wheels 8, 11 of the tractor 1 catch in the rear end parts 160B of the left and right climb-up assist members 160 and climb up, and damage to the engaging fixture 57 and other problems caused by this uprising can be prevented.

In the left and right transmission covers 39 as shown in FIGS. 25 through 27, round bar members 65 are welded in a left-right orientation in positions below the engaging parts 57B in the ceiling walls 39A. The engaging parts 57B can thereby be prevented from deforming due to pressure on the engaging parts 57B when the wheels 8, 11 of the tractor 1 transfer from the transmission covers 39 to the front upper part 37A of the mower deck 37, and the engagement of the engaging parts 57B with the engaged fixtures 56 can be prevented from being released by this deformation.

[26] The climb-up assist members 160 may be detachably connected to the transmission covers 39 by bolts/nuts or the like.

Figure 29:
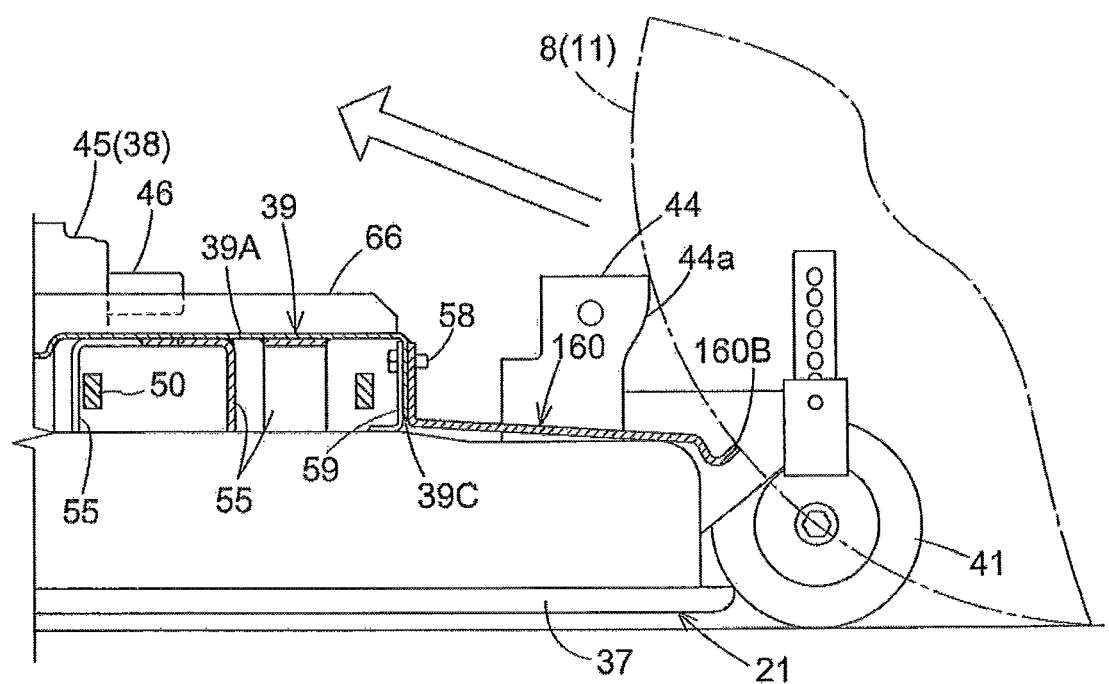
FIG. 29 is a partial side view showing the relevant parts of the structure according to another embodiment.

[27] As shown in FIG. 29, the climb-up assist member 160 may be configured extending to the rear so as to conform to the upper surface of the mower deck 37 from the transmission cover 39 to the rear end part of the mower deck 37.

Figure 30:
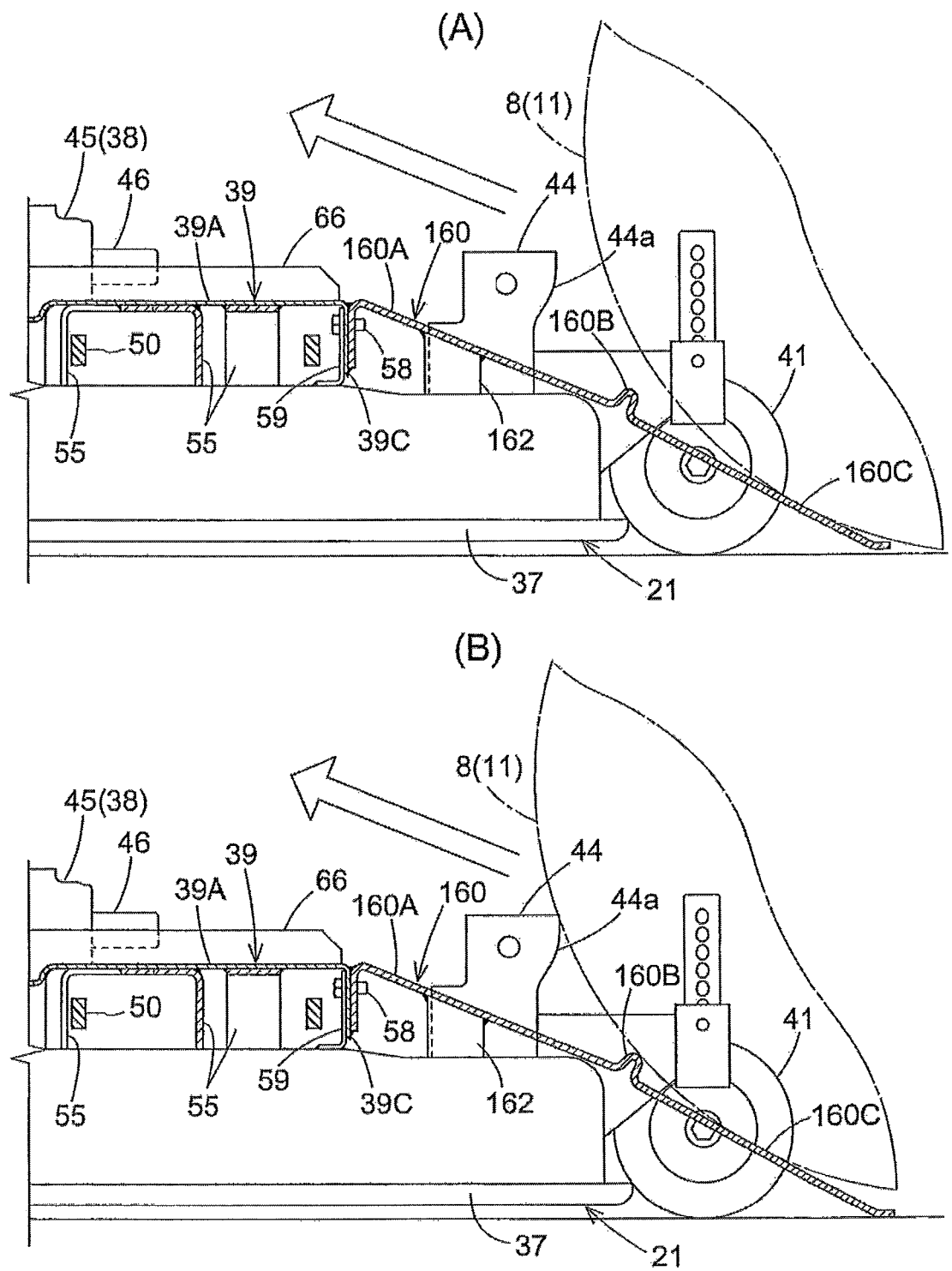
FIG. 30 is a partial side view showing the relevant parts of the structure according to another embodiment.

[28] As shown in FIG. 30, the climb-up assist member 160 may be configured to have a rear portion 160C that extends further to the rear from the anti-slip portion 160B formed in the vicinity of the rear end part of the mower deck 37, and so that the rear portion 160C is formed in a manner in which this portion tilts downward and to the rear from the anti-slip portion 160B. In this configuration, when the rear portion 160C is configured to elastically deform from a state of separation from the ground surface (see FIG. 30A) to a state of contact with the ground (see FIG. 30B) in conjunction with the pressure of the wheels 8, 11, damage to the landscape due to ground contact of the rear portion 160C can be prevented during mowing, and the front end sides of the transmission covers 39 can be more reliably prevented from rising up from the front upper part 37A of the mower deck 37 due to recoil when the wheels 8, 11 climb up on the climb-up assist members 160 during climbing by the work vehicle 1.

[29] Various modifications may be made to the numerical quantity, shape, and other characteristics of the anti-slip portions 160B in the climb-up assist members 160. For example, a plurality of anti-slip portions 160B shaped as a horizontal line when viewed from above, a peak as viewed from above, an inverted peak as viewed from above, an upside-down check mark as viewed from above, or an inverted upside-down check mark as viewed from above may be formed so as to protrude upward in the climb-up assist members 160. A plurality of anti-slip portions 160B having different shapes may also be formed so as to protrude upward in the climb-up assist members 160. Furthermore, an anti-slip portion 160B may be formed in a climb-up assist member 160 by welding a separate member so as to protrude upward.

The invention claimed is:

1. A mower unit configured to be attached at a position between front wheels and rear wheels of a work vehicle, comprising:
    a mower deck;
    at least one blade supported by the mower deck;
    a transmission mechanism for driving the blade provided to project from a ceiling area of the mower deck; and
    a climb-up assist comprising a transmission cover covering the transmission mechanism from above and forming a ceiling wall over the transmission mechanism;
    wherein the transmission cover comprises a pair of right/left transmission covers for covering right/left ends of the transmission mechanism from above, the right/left transmission cover being detachably attached to the mower deck by a connecting mechanism, the right/left transmission cover is formed by bending a steel plate so as to have a ceiling wall and a rear wall;
    wherein the climb-up assist further comprises a climb-up assist member secured to the transmission cover and extending from the transmission cover at least to a rear wall of the mower deck, the climb-up assist member comprising a rear end part for preventing the wheels from slipping when travelling over the mower deck before the mower deck is attached to the work vehicle;
    wherein the climb-up assist member is formed by a steel plate and secured to the rear wall of the transmission cover, the climb-up assist member comprising an extension part which extends rearward from the rear wall of the transmission cover toward a rear end of the mower deck along a top wall of the mower deck, the rear end part of the climb-up assist member projecting rearward from the mower deck;
    wherein the climb-up assist member extends rearward from a bottom end of the rear wall of the transmission cover, and only the rear end part of the climb-up assist member extends rearward of a rear end wall of the mower deck, the rear end part being positioned above the ground; and wherein the transmission cover and the climb-up assist member are detachable together by the connecting mechanism from the mower deck.

2. A mower unit configured to be attached at a position between front wheels and rear wheels of a work vehicle as claimed in claim 1, wherein the rear end part of the climb-up assist member is bent to extend upward.

3. A mower unit configured to be attached at a position between front wheels and rear wheels of a work vehicle as claimed in claim 1, wherein the climb-up assist member extends toward the rear end of the mower deck with a lateral width thereof remaining unchanged.

4. A mower unit configured to be attached at a position between front wheels and rear wheels of a work vehicle as claimed in claim 1, wherein the climb-up assist further comprises a ceiling wall reinforcing member raised above a top face of the ceiling wall to extend fore and aft across the ceiling wall; and wherein the ceiling wall reinforcing member is secured to a lateral inner side of the ceiling wall to prevent right/left slippage of the wheel from the ceiling wall after riding on the ceiling wall.

5. A mower unit configured to be attached at a position between front wheels and rear wheels of a work vehicle as claimed in claim 1, wherein the climb-up assist member extends rearward so as to conform to an upper surface of the mower deck from the transmission cover to the rear end part of the mower deck.

* * * * *

UNITED STATES PATENT AND TRADEMARK OFFICE
CERTIFICATE OF CORRECTION

PATENT NO.        : 8,720,173 B2  
APPLICATION NO.   : 13/676526  
DATED             : May 13, 2014  
INVENTOR(S)       : Akihito Sugio et al.

It is certified that error appears in the above-identified patent and that said Letters Patent is hereby corrected as shown below:

On the Title Page, Column 2, item (56), under U.S. PATENT DOCUMENTS, please insert
-- 4,920,596   5/1990   Stevens --

Signed and Sealed this
Second Day of September, 2014

Michelle K. Lee
*Deputy Director of the United States Patent and Trademark Office*